United States Patent
Ishihara et al.

(10) Patent No.: US 6,287,677 B1
(45) Date of Patent: Sep. 11, 2001

(54) CARBON FIBER PREPEG FOR WOOD REINFORCEMENT, WOODEN SHEET LAMINATED THEREWITH, WOOD REINFORCING COMPOSITE COMPRISING CARBON FIBERS AND THE WOODEN SHEET, AND CARBON FIBER REINFORCED WOOD

(75) Inventors: Shigehisa Ishihara, Kyoto; Hiroyasu Ogawa, Tokyo; Yoshihiro Endoh, Shizuoka; Isamu Ide, Osaka; Hideo Getto, Aichi; Satoshi Saito, Nagano, all of (JP)

(73) Assignees: Toho Rayon Co., Ltd.; Shigehisa Ishihara; Lignyte Co., Ltd.; Aica Kogyo Co., Ltd., all of (JP)

( * ) Notice: Subject to any disclaimer, the term of this patent is extended or adjusted under 35 U.S.C. 154(b) by 0 days.

(21) Appl. No.: 09/142,695
(22) PCT Filed: Mar. 21, 1997
(86) PCT No.: PCT/JP97/00950
§ 371 Date: Sep. 14, 1998
§ 102(e) Date: Sep. 14, 1998
(87) PCT Pub. No.: WO97/35911
PCT Pub. Date: Oct. 2, 1997

(30) Foreign Application Priority Data

Mar. 22, 1996 (JP) .......................................... 8-93566
Mar. 22, 1996 (JP) .......................................... 8-95367

(51) Int. Cl.⁷ .................................................. B32B 21/10
(52) U.S. Cl. ................... 428/292.1; 428/292.4; 428/299.1; 428/300.7; 428/301.4; 428/537.1
(58) Field of Search .............................. 428/292.4, 292.1, 428/299.1, 300.7, 301.4, 537.1

(56) References Cited

U.S. PATENT DOCUMENTS 4,061,620 * 12/1977 Gillern .

FOREIGN PATENT DOCUMENTS 53108182 9/1978 (JP) .
54066973A * 5/1979 (JP) .

(List continued on next page.)

OTHER PUBLICATIONS

Chang et al, Journal of Applied Polymer Science, vol. 27, pp. 4759–4772 (1982).
Chemical General Remarks No. 8 & English language translation of Table 8.

Primary Examiner—Elizabeth M. Cole
(74) Attorney, Agent, or Firm—Lorusso & Loud

(57) ABSTRACT

The first group of the present invention is a wood reinforcing carbon fiber prepreg, which is produced through impregnation with a mixture resin at a viscosity of 3 to 150 poises at 20° C., wherein the mixture resin contains one or more resins selected from resorcinol based resins and resol type phenol based resins, formaldehydes as curing agents and inorganic acids or organic acids as curing catalysts. The first group of the present invention is a wood reinforcing carbon fiber prepreg having a longer usable time and being capable of imparting the rigidity and elastic modulus of carbon a fiber to the wood to be reinforced at a high ratio.

The second group of the present invention is a wood reinforcing carbon fiber prepreg attached wood based sheet, wherein a wood based sheet of a thickness of 0.01 mm to 0.06 mm is arranged on at least one face of a carbon fiber prepreg sheet produced through impregnation with a mixture resin containing a thermosetting resin and a curing agent or a curing catalyst. The second group of the present invention is a carbon fiber prepreg sheet, or a carbon fiber prepreg attached wood based sheet produced through the attachment of the strand, or a carbon fiber composite wood based sheet produced by curing them, characterized in that it has excellent adhesivity and handleability with no occurrence of environmental pollution when applied to wood and glued laminated lumbers, to impart the rigidity and elastic modulus of carbon fiber to the wood to be reinforced at a high ratio.

12 Claims, 2 Drawing Sheets

FOREIGN PATENT DOCUMENTS

| | | |
|---|---|---|
| 3230904 | 2/1990 | (JP) . |
| 4215840 | 8/1992 | (JP) . |
| 6-49161 | 2/1994 | (JP) . |
| 6122178 | 5/1994 | (JP) . |
| 8-25574 | 1/1996 | (JP) . |

* cited by examiner

CARBON FIBER PREPEG FOR WOOD REINFORCEMENT, WOODEN SHEET LAMINATED THEREWITH, WOOD REINFORCING COMPOSITE COMPRISING CARBON FIBERS AND THE WOODEN SHEET, AND CARBON FIBER REINFORCED WOOD

TECHNICAL FIELD

The present invention relates to a wood reinforcing carbon fiber prepreg, and a carbon fiber reinforced wood, having been reinforced through the adhesion of the carbon fiber prepreg onto a wood material. More specifically, the present invention relates to a wood reinforcing carbon fiber prepreg wherein a specific matrix resin with excellent wood adhesivity is impregnated into a carbon fiber, and a carbon fiber reinforced wood produced by integrally attaching the carbon fiber prepreg on the surface of wood or the surface of a glued laminated lumber, or between some laminae composing a laminated lumber or between single laminae.

In a group different from the invention described above, the present invention relates to a wood based sheet containing a wood reinforcing carbon fiber and a carbon fiber reinforced wood; more specifically, the present invention relates to a carbon fiber prepreg attached wood based sheet with excellent adhesivity, handleability and processability; additionally, the invention relates to a carbon fiber composite wood based sheet produced by curing the carbon fiber prepreg wood based sheet, and a carbon fiber reinforced wood produced by integrally attaching each such sheet onto the surface of single wood, the surface of the glued laminated lumber or between some laminae or lamina composing the glued laminated lumber.

BACKGROUND ART

Woods and wood composites such as solid wood and glued laminated lumber and the like have conventionally been used primarily as framing structures such as column and beam in buildings, and additionally in recent years, attention has been focused on the attempts to apply such solid wood and glued laminated lumber to large scale constructions such as wood bridge and large-scale dome. Among such solid wood and glued laminated lumber, the glued laminated lumber is produced by arranging the fiber directions of sweeping laminae or small square timbers preliminarily cut in longer lengths in parallel along the fiber directions and thereafter laminating them together vertically or arranging them horizontally to bond them together with adhesives, and compared with solid wood, therefore, the glued laminated lumber has characteristic properties such as higher freedom from dimension and shape and less dispersion in product strength and less occurrence of crack and warp during drying, so such glued laminated lumber has good advantages such as ready production of curved materials.

So as to impart sufficient rigidity and strength to woods such as solid wood and glued laminated lumber if used for large-scale buildings and constructions, however, it is required to enlarge the thickness thereof, so that the ceiling of the buildings and constructions is essentially low, or is high more than necessary, disadvantageously.

As a wood material with enhanced rigidity and strength but with no enlarged thickness, it has been proposed recently carbon fiber reinforced wood and carbon fiber reinforced glued laminated lumber, which are produced by bonding carbon fiber through adhesives to single wood or glued laminated lumber.

For example, Japanese Patent Laid-open No. Hei 3-230904 discloses a process comprising arranging carbon fiber on the surface of wood coated with an adhesive, thereby impregnating the adhesive into the fiber and bonding the wood together. Additionally, for example, Japanese Patent Laid-open No. Sho 53-108182 discloses a process comprising preliminarily impregnating carbon fiber with an adhesive to prepare a carbon fiber prepreg, which is then bonded to wood to reinforce the wood.

In so-called composite materials reinforced with carbon fiber, epoxy resins are frequently used as the matrix resins. Epoxy resins have a drawback of extremely poor thermal resistance or fire resistance although the resins have extremely great adhesivity to carbon fiber. Hence, wood reinforced with composite materials produced by using epoxy resins cannot satisfy the provision of thermal resistance or fire resistance required for large scale buildings or large scale constructions.

So as to reinforce wood or glued laminated lumbers in recent years, attempts have been made to reinforce wood or glued laminated lumbers with composite materials comprising carbon fiber and matrix resins. As the adhesive material (matrix resin) to be used for such composite materials, resins such as phenol based resins and resorcin based resins are used.

These resins are said to have sufficient water resistance, corrosion resistance, fire resistance and thermal resistance required for wood buildings and constructions and to be effective for adhesion between woods.

When these matrix resins are used to prepare a carbon fiber prepreg, however, there have been the following problems; a problem of poor adhesivity between carbon fiber and the matrix resins; a problem of poor adhesivity between carbon fiber and wood; a problem of poor fluidity of the matrix resins during the adhesion to wood; and a problem of extreme difficulty in preparing a prepreg with a longer shelf life having a longer usable time, which is inevitable for plant production under controls.

Furthermore, conventional carbon fiber prepreg is poor in adhesivity to wood such as wood and glued laminated lumber and therefore, the resulting carbon fiber reinforced wood and carbon fiber reinforced glued laminated lumber have low rigidity and strength in spite of the amount of the carbon fiber used therein, so expensive carbon fiber should be used at a greater amount than necessary and carbon fiber is hence not efficiently used.

When conventional carbon fiber prepreg is bonded to wood such as wood and glued laminated lumber, additionally, the bonded layer is disadvantageously peeled off during use. As one of the causes, it has been inferred that the matrix resins might have a close relation.

When intending the adhesion of a carbon fiber prepreg to wood, the adhesivity varies because wood is a natural product having variable properties, depending on the wood species and their growing environment and others. So as to procure adhesivity, furthermore, laborious adjustments are needed, including the selection and adjustment of the state of the matrix resins to be used for such prepreg, namely solid, semi solid or liquid state thereof, as well as the amount thereof, so economical and quality problems have been present.

So as to roll a carbon fiber prepreg in a roll or stack the prepreg in sheet for delivery or storage, furthermore, release paper is arranged on one face or both the faces of the prepreg so as to avoid the adhesion of each other, but laborious and time consuming processing works such as the removal of the release paper when the prepreg is attached to wood are necessary, problematically and the removed release paper turns waste to cause environmental pollution.

So as to overcome these conventional problems, the present inventors have made investigations and consequently, the inventors have found that these problems can be overcome by preparing a carbon fiber prepreg by using a mixture resin containing a specific matrix resin and a specific curing agent and a specific curing catalyst, and have attained the present invention. Additionally, the inventors have found that these problems can be overcome by a specific carbon fiber sheet and a carbon fiber reinforced wood, and have attained the present invention.

In other words, it is the object of a first group of the present invention to provide a carbon fiber prepreg having excellent adhesivity and a longer usable time such that the prepreg can be bonded to wood or glued laminated lumbers for use and which can impart the elasticity modulus and strength of the carbon fiber to wood and glued laminated lumbers at a higher ratio. It is the other object in association with the first group of the present invention to provide wood, a glued laminated lumber and a wood laminated material having high rigidity and strength, herein the carbon fiber prepreg is used.

It is the object of a second group of the present invention to provide a carbon fiber prepreg attached wood based sheet , and a carbon fiber composite wood based sheet produced by curing the sheet, in which carbon fiber prepreg is a carbon fiber sheet or a carbon fiber strand prepreg with excellent adhesivity, handleability and processability and with no occurrence of environmental pollution, which sheet can be bonded to wood and glued laminated lumbers for use. It is the other object in association with the second group of the present invention to provide wood or a glued laminated lumber with high rigidity and strength, where the carbon fiber prepreg attached wood based sheet and a carbon fiber composite wood based sheet produced by curing the sheet are used.

Other objects in association with the first group of the present invention and the second group of the present invention enlarge the utility of wood to large scale buildings and constructions, which is never conventionally possible, and are to provide wood and a glued laminated lumber as reinforced with carbon fiber, which are useful for reducing the amount of natural wood to be used and reducing the weight of the resulting buildings and constructions.

DISCLOSURE OF THE INVENTION first group of the present invention relates to a wood reinforcing carbon fiber prepreg, which is produced by impregnating a carbon fiber with a mixture resin at a viscosity of 3 to 150 poise at 20° C., wherein the mixture resin contains one or more of matrix resins selected from resorcinol based resins and resol type phenol based resins, and a component with curing function, the component with curing function being selected from curing agents comprising formaldehydes and one or more curing catalysts selected from inorganic acids and organic acids.

The gel time of the mixture resin to be used for the first group of the present invention at 30° C. is characteristically 50 minutes or more.

The mixture resin to be used in the first group of the present invention is characteristically in a liquid form.

The first group of the present invention is a carbon fiber reinforced wood, produced by making a combination of the wood reinforcing carbon fiber prepreg with wood to be reinforced, and pressurizing and integrating them together, and the means for making a combination of the wood reinforcing carbon fiber prepreg with wood to be reinforced is selected from means to attach the wood reinforcing carbon fiber prepreg on the surface of wood, to attach the prepreg on the surface of a glued laminated lumber and to insert the prepreg between plural laminae. The means for integrating the wood reinforcing carbon fiber prepreg with wood to be reinforced may satisfactorily be pressurization in combination with heating.

The second group of the present invention is a wood reinforcing carbon fiber prepreg attached wood based sheet, wherein a wood based sheet of a thickness of 0.01 mm to 2.0 mm is arranged on at least one face of the carbon fiber prepreg sheet produced through impregnation with a mixture resin containing a thermosetting resin and a component with curing function.

Another embodiment of the second group of the present invention is a wood reinforcing carbon fiber prepreg attached wood based sheet, characterized in that a carbon fiber strand prepreg produced through impregnation with a mixture resin containing a thermosetting resin and a component with curing function is arranged in parallel on the surface of a wood based sheet of a thickness of 0.01 mm to 2.0 mm.

Another embodiment of the second group of the present invention is the wood reinforcing carbon fiber prepreg attached wood based material, wherein another wood based sheet is attached on the wood reinforcing carbon fiber prepreg.

An additional embodiment of the second group of the present invention is the wood reinforcing carbon fiber composite wood based sheet, produced by integration of the wood reinforcing carbon fiber prepreg attached wood based sheet under heating and pressurization.

The wood reinforcing carbon fiber prepreg attached wood based sheet or wood reinforcing carbon fiber composite wood based sheet, relating to the second group of the present invention, has been integrated in combination with a reinforcing wood under heating and pressurization, and the sheet is attached on the surface of wood or attached on the surface of a glued laminated lumber or inserted between plural laminae, to produce a carbon fiber reinforced wood composites.

The wood reinforcing carbon fiber prepreg and the wood reinforcing carbon fiber prepreg attached wood based sheet in the first group and second group of the present invention can impart high strength and rigidity to wood and have good adhesivity to wood, and are flexible and have a longer usable time, so such prepreg and wood based sheet have great workability, characteristically.

The "wood" or "solid wood" in the present Specification means wood of an appropriate shape after processing such as cutting out from natural wood and treatment such as chemical treatment if necessary.

The "glued laminated lumber" in the Specification means lumber produced by overlaying vertically sweeping laminae or small square timbers cut in a longer length along the fiber directions thereof while keeping the fiber directions in parallel to each other or arranging horizontally them, thereafter bonding them together with adhesives.

The "wood based material" in the Specification means wood per se, glued laminated lumber per se, or wood such as wood or glued laminated lumber after mixed with or laminated with a material of a different type.

The "strand prepreg" or "strand of prepreg" in the Specification means strand impregnated with a resin, the strand being in the shape of strand.

The "prepreg sheet" in the Specification means prepreg in a sheet shape, including for example a sheet produced by winding a carbon fiber strand on a drum while impregnating the carbon fiber strand with a resin, simultaneously enlarging the width of the carbon fiber strand to integrate them together and cutting the resulting integrated product along the drum axial direction.

The "composite" in the present Specification means the state of a matrix resin or a matrix resin comprising a material of a different material, after curing and integration.

The present invention will now be described in detail below.

The matrix resin to be used in the present invention includes known resol type phenol based resins (resins of phenols and formaldehyde produced by initial addition condensation), as produced by preparing a methyrol from phenols with one phenolic hydroxyl group, such as phenol, cresol, xylenol, ethyl phenol, chlorophenol, and bromophenol or oligomers and phenols with two phenolic hydroxyl groups, such as resorcin, hydroquinone, catechol, and chloroglycinol, and aldehydes such as formaldehyde, p-formalhyde, acetoaldehyde, furfural, benzaldehyde, trioxane, and tetraoxane at a molar ratio of phenols/aldehydes=2/1 to 1/3, preferably 5/4 to 2/5 in the presence of an alkali catalyst such as potassium hydroxide and sodium hydroxide; and resorcinol resins.

The molecular weight of the matrix resin to be used in accordance with the present invention is preferably 100 to 2,000, particularly preferably 150 to 500 as an average molecular weight on a polystyrene basis by high performance liquid chromatography (HPLC).

As organic curing agents, formaldehyde, acetoaldehyde, furfural, benzaldehyde, trioxane and tetraoxane are preferable among known resorcinol resins and resol based phenolic resins of paste or liquid properties when mixed with the matrix resin and for use as curing agents.

As curing catalysts, organic acids such as p-toluenesulfonic acid, benzenesulfonic acid, xylenesulfonic acid and phenolsulfonic acid or inorganic acids such as sulfuric acid, nitric acid and sulfuric acid are preferable, these acids having a property such that the acids are dissolved at a liquid state when mixed with the matrix resin.

So as to homogeneously cure the prepreg, additionally, preference is given to a curing agent at a homogeneous liquid state at not more than 35° C. as routine prepreg, preparation temperature when prepared as a mixture resin, or a curing catalyst.

From the respect of adhesivity, the carbon fiber to be used in the present invention is preferably but with no specific limitation, a carbon fiber with a nitrogen content of 0.1 to 15% by weight, tensile strength of 2500 to 7000 MPa and an elasticity modulus of 150 to 700 GPa, as produced from polyacrylonitrile based fiber, particularly a carbon fiber of a diameter of 5 to 9 μm and with a nitrogen content of 3 to 10% by weight, tensile strength of 3500 MPa or more and an elasticity modulus of 250 to 350 GPa.

Preferably, furthermore, the surface oxygen/carbon is 0.1/1 to 0.3/1, particularly 0.15/1 to 0.25/1 on the surface of the carbon fiber in accordance with the present invention, as determined by ESCA surface analyzer (Shimadzu, Co.), because the adhesive strength can be enhanced in that case.

The carbon fiber to be used in accordance with the present invention is of a fiber diameter of 5 to 9 microns, and a desired number of fiber bundles each of 1000 to 300,000 fibers (strand) as a composition number is bundled or is enlarged into a sheet form for subsequent use.

The wood reinforcing carbon fiber prepreg in accordance with the present invention may be in a form of a strand prepreg or a prepreg sheet. Strand prepreg is produced by continuously dipping the strand of carbon fiber in a mixture resin produced by mixing at least one of the resins, formaldehyde as a curing agents or inorganic acids or organic acids as curing catalysts, and inorganic fillers if necessary to impregnate the strand with the mixture resin at a final concentration of 30 to 80% by weight of the mixture resin to carbon fiber, and thereafter drying the vaporizing components to wind the resulting prepreg.

Additionally, prepreg sheets are prepared by using known means comprising winding the carbon fiber strand over a drum so that the fiber might be in parallel to each other or comprising arranging the carbon fiber strands in parallel under pressure with a roll on the resin membrane of release paper preliminarily coated with the matrix resin to permeate the resin into the fiber, or the like.

When the carbon fiber strand is used as a reinforcing material at the process of producing the wood reinforcing carbon fiber prepreg in accordance with the present invention, the strand can be handled by known methods comprising deposition of powdery inorganic matters such as talc on the surface or arranging release paper on one face or both the faces if the reinforcing material is a carbon fiber sheet.

The mixture resin to be used in accordance with the present invention is required to be a homogeneous solution for homogeneous impregnation and homogenous curing of carbon fiber, and unless the solution is homogenous, the resulting prepreg is poorly cured or lowly adhesive, unpreferably. If the amount of the mixture resin in the prepreg impregnated with the mixture resin is not more than 30% by weight, the prepreg is poorly adhesive to wood; if above 80% by weight, the prepreg is handled with much difficulty, such that the resin might fall from the prepreg, unpreferably. Particularly, 40 to 60% by weight is preferable from the adhesivity and handleability of the prepreg.

The viscosity of the mixture resin to be used in accordance with the present invention is preferably 3 to 150 poises at 20° C.; particularly, the viscosity of 50 to 100 poises is excellent in terms of shape retention and handleability of the prepreg. If the viscosity is 3 poises or less, the resin readily falls out of the prepreg; if the viscosity is more than 150 poises, the impregnation of the resin into the carbon fiber is so poor that the bending strength, bending elasticity modulus and interlaminar shear strength and the like are lowered when the prepreg is made into a carbon fiber resin composite material, which affects disadvantageously the mechanical performance. The viscosity adjustment may satisfactorily be done by adding water.

Furthermore, the gel time of the prepreg impregnated with the mixture resin is preferably 50 minutes or more at 30° C.; if below 50 minutes, the prepreg may be cured during the transfer of the prepreg to customers or may be cured gradually at −20° C. as a routine storage condition, so the prepreg cannot be stored even for one to 2 weeks, uneconomically.

The wood and glued laminated lumber in accordance with the present invention are commercially woods, satisfactorily, with no specific limitation, and as such wood and glued laminated lumber, use may be made of woods for use in buildings, such as cedar, cypress, larch, American pine, spruce; and woods for use in plywoods, such as oak, paulownia, keyaki, maple, horse chestnut, Magnolia hypoleuca, cherry, teak, lauan, spinarl and others.

The sheet of the carbon fiber prepreg or the strand of the carbon fiber prepreg in accordance with the present invention may be bonded to wood and glued laminated lumbers for integration as follows.

More specifically, after a resin produced by mixing the resin to be used in accordance with the present invention and a curing agent or inorganic acids or organic acids as curing catalysts, particularly preferably the mixture resin to be used for the carbon fiber prepreg is coated on the surface of wood and a glued laminated lumber and the surface of a thin lamina for glued laminated lumber, if necessary, the carbon fiber prepreg (sheet or strand) is attached on the coated surface so that the direction of the carbon fiber might be in parallel to the fiber direction of wood.

For thin laminae of glued laminated lumber, additionally, a thin lamina attached with the carbon fiber prepreg is laminated through an adhesive on other several thin laminae of glued laminated lumber by a known process, which is then heated at a pressure of 1 to 15 kg/cm$^2$ and at a temperature of ambient temperature to 120° C. for 5 to 24 hours.

When intending to bond the carbon fiber prepreg on the surface of wood and glued laminated lumber and prepare wood based surface, other thin wood and wood based thin sheets may satisfactorily be bonded to the outer surface of the carbon fiber prepreg.

The carbon fiber reinforced wood of the present invention may be applied to utilities to be used as general wood and glued laminated lumber and the wood is particularly preferable for large scale buildings such as school, gymnasium, lecture hall, various indoor ball game grounds, and domes; and framing materials for houses of three stories or more and wood bridges.

In the second group of the present invention, wood based sheet is used instead of the release paper to be used in the first group of the present invention, and the wood based sheet is integrated with the wood reinforcing carbon fiber prepreg and is finally integrated with the reinforcing wood. More specifically, on at least one face of the wood reinforcing carbon fiber prepreg produced by impregnation with a mixture resin containing a thermosetting resin and a component with curing function is arranged a wood based sheet of a thickness of 0.01 to 2.0 mm. For handling as a roll in a curl shape, the thickness of the wood based sheet is preferably 0.05 to 0.3 mm.

One embodiment of the second group of the present invention is the wood reinforcing carbon fiber prepreg with one face attached with a wood based sheet, which is prepared by mixing one or more of the resins, a curing agent or a curing catalyst and an inorganic filler and the like together, continuously dipping the strand of carbon fiber in the resulting liquid mixture resin to impregnate the carbon fiber with the resins to 30 to 80% by weight, drying the vaporizing matters if necessary, winding the fiber in parallel to each, other on a wood based sheet preliminarily wound around a drum, drying the fiber if necessary and subsequently cutting the fiber along the width direction of the drum, or which is prepared by permeating the resin into the fiber while arranging the carbon fiber strand on a wood based sheet with the surface preliminarily coated with the resin, while arranging the strand in parallel under pressure by means of a roll.

Another embodiment of the second group of the present invention is a wood based sheet with both the faces attached with the wood reinforcing carbon fiber prepreg, which is prepared by attaching another wood based sheet on the face with no wood based sheet thereon during or after the course of the preparation of the wood based sheet with one face attached with the wood reinforcing carbon fiber prepreg.

The wood based sheet attached with the carbon fiber strand prepreg according to the second group of the present invention can be prepared by keeping the space between the carbon fibers in case that the carbon fiber is wound to each other or is arranged as described above. Otherwise, impregnation is progressed so that the mixture resin might occupy 30 to 80% by weight, and thereafter, the vaporizing matters are dried, and if necessary, powdery inorganic matters such as talc are deposited on the surface to prepare a carbon fiber strand prepreg, which is then wound on the wood based sheet preliminarily wound around a drum so that the carbon fiber might be parallel to each other, to prepare the wood based sheet attached with the carbon fiber strand prepreg. Otherwise, the carbon fiber strand is arranged and prepared in parallel on the wood based sheet under pressure by means of a roll and if necessary, another wood based sheet is attached on the side of the carbon fiber strand with no wood based sheet attached thereon, to prepare a sheet of the carbon fiber strand prepreg attached with the wood based sheets on both the faces thereof.

Such wood based sheet to be used in the second group of the present invention includes those produced by using known commercially natural woods such as dao, oak, birch, cypress, cedar, cherry, maple, teak, pine, Pork Orford cedar and spruce, by known means with slicers; known thin laminae of for example paper and non-woven fabric, or fiber sheet produced by using wood based pulp; and spruce and Pork Orford cedar in particular are preferable, because when these woods are attached to the carbon fiber prepreg in the first group of the present invention, which is subsequently bonded to wood, these impart high adhesivity and mechanical performance and exert particularly excellent resistance against release after boiling in water. Preferably, the thickness is 0.01 to 0.6 mm. If the thickness is below 0.01 mm, the sheet performance is poor along the width direction of the carbon fiber prepreg, causing difficulty in handling thereof; if the thickness is above 0.6 mm, alternatively, the flexibility is lowered, causing the deterioration of the post-processability, unpreferably. Particularly, 0.3 mm is preferable from the respect of flexibility.

BEST MODE FOR CARRYING OUT THE INVENTION

Figure 1:
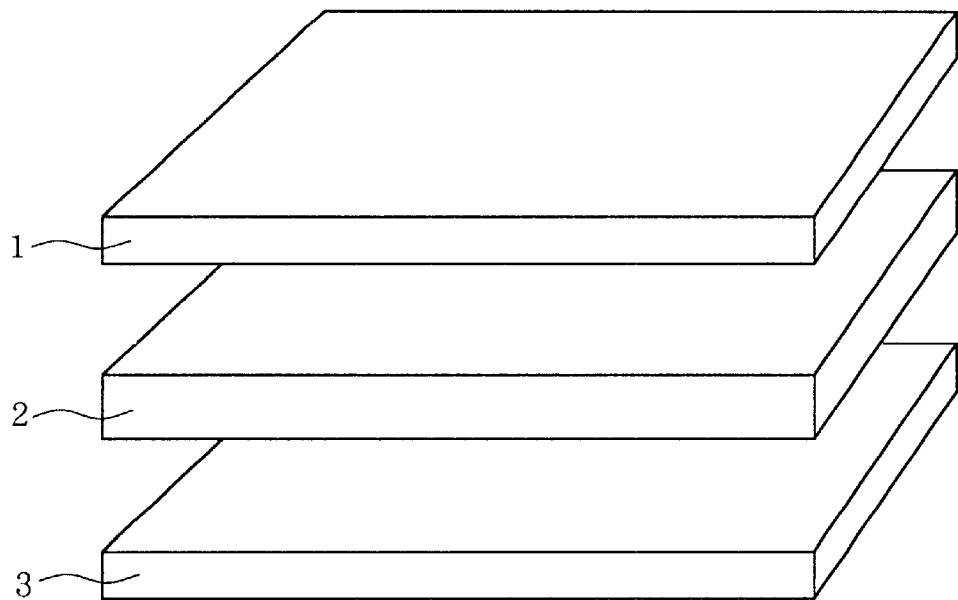
FIG. 1 depicts one example of the lamination state of the wood reinforcing carbon fiber prepreg attached wood based sheet in the second group of the present invention, wherein wood based sheets 1, 3 are attached to both the sides of carbon fiber prepreg sheet 2 to laminate them together.

The present invention will now be described in detail in the following examples, but the invention is not limited to the following examples, unless departing from the spirit of the invention.

The gel time to be used in accordance with the present invention is a time required to reach the maximum torque when the curing of the mixture resin containing a resin and a curing agent to be used for the carbon fiber prepreg is measured by using Curast Meter (Nippon Synthetic Rubber, Co.).

Furthermore, the bending performance and interlaminar shear strength of the carbon fiber resin composite material were measured and determined according to JIS K7074 and JIS K7078, respectively, and the viscosity was determined by using Rheometer (Rheometrics, Co.). Additionally, the bending elastic modulus and bending strength of wood and glued laminated lumber and carbon fiber reinforced wood and glued laminated lumber thereof were measured according to JIS Z2101. Still additionally, block shear strength was determined according to JAS Standard, Article No. 3 concerning structural glued laminated lumbers with large cross sections.

EXAMPLE 1

The strand of a carbon fiber "Besfite (registered trademark) HTA 12K" (Toho Rayon, Co. Ltd. ) with fiber properties such as single fiber diameter of 7 microns, fiber number of 12,000, tensile strength of 3890 MPa and tensile elastic modulus of 236 GPa, continuously passed, through a resin bath placing therein a mixture resin (viscosity of 35 poises at 20° C.) produced by homogeneously mixing and dissolving together 82 parts of a resol type phenol resin "AH-343" (trade name, Lignyte, Co. Ltd. ) and 18 parts of a component with curing function, "D-5" (trade name, Lignyte, Co. Ltd.) containing a curing catalyst primarily comprising p-toluenesulfonic acid and a curing agent at ambient temperature, at 3 m/min for an impregnation time of one minute. Then, the amount of the resin contained therein was adjusted by means of a squeeze roll to 45% by weight. Continuously following the resin impregnation process, the strand impregnated with the resin was wound in parallel around a drum of a diameter of 90 cm and with preliminarily wound release paper, to final width of 100 cm, followed by drying at 60° C. for one hour, to prepare the wood reinforcing carbon fiber prepreg of the present Example 1.

The resulting wood reinforcing carbon fiber prepreg was cut off from the drum, to prepare a carbon fiber prepreg sheet with a carbon fiber weight of 300 g/m$^2$ and of a width of 100 cm and a length of about 2.8 m, and the gel time of the carbon fiber prepreg sheet was measured, which was 150 minutes at 30° C.

The carbon fiber prepreg sheet was placed in a mold of a depth of 3 mm, a width of 100 mm and a length of 100 mm, while keeping the fiber direction in parallel and laminating the sheet together, for curing under heating at a pressure of 10 kg/cm$^2$ and 60° C. for 2 hours, to prepare a 3-mm thick plane board of a carbon fiber resin composite material. From the plane board was cut out a rectangle test piece of a width of 10 mm and a length of 100 mm along the fiber direction which was along the lengthwise direction, to measure the bending performance. The content of the carbon fiber in the composite material was 60% by volume; the bending strength, 1634 MPa; the bending elastic modulus, 135 GPa; and the interlaminar shear strength, 74 MPa. These values corresponded to 70% and 95% [percentage of (strength or elastic modulus of carbon fiber )×carbon fiber content], respectively on the basis of the strength and elastic modulus of the carbon fiber per se and the carbon fiber content, which were very high values.

Comparative Example 1

In the same manner as in Example 1, except for the use of paraformaldehyde of an average grain size of 1 μm instead of the curing agent used in Example 1, a mixture resin (viscosity of about 160 poises at 20° C.) was recovered, which was then impregnated to prepare a board of a carbon fiber resin composite material. In the same manner as in Example 1, the board performance was measured. The bending strength was 830 MPa; the bending elastic modulus was 118 GPa and the interlaminar shear strength was as low as 31 MPa.

Comparative Example 2

In the same manner as in Example 1, except for the use of a low molecular compound (molecular weight of 90) as a resol type phenol resin used in the Example 1, a mixture resin was recovered. The viscosity of the mixture resin at 20° C. was 2 poises.

In the same manner as in the Example 1, a carbon fiber prepreg was prepared at 20° C. from the mixture resin, and then, the resin flowed out of the resulting prepreg during handling, so the predetermined resin amount could be kept with much difficulty. Additionally, a plane board of a carbon fiber resin composite material was produced by using the carbon fiber prepreg in the same manner as in the Example 1, and then, a considerable amount of the resin flowed out during molding, so that a plane board at a desired carbon fiber content could never be produced.

Comparative Example 3

In the same manner as in Example 1, except for the use of formaldehyde instead of the curing agent used in the Example 1, a mixture resin was recovered. The viscosity of the mixture resin at 20° C. was 33 poises, while the gel time of the mixture resin was 30 minutes.

When a carbon fiber prepreg was prepared by using the mixture resin in the same manner as in the Example 1, curing progressed at the drying process of preparation, so that a prepreg of a board shape with no flexibility was prepared. By using the resulting board, a plane board of a carbon fiber composite material was prepared in the same manner as in the Example 1. The plane board was poor in that the bending strength, bending elastic modulus and interlaminar shear strength of the board were as low as 1205 MPa, 113 GPa and 32 MPa, respectively.

EXAMPLE 2

A carbon fiber reinforced wood of the present Example 2 was prepared by peeling off the release paper from one sheet of the wood reinforcing carbon fiber prepreg recovered in the aforementioned Example 1 and subsequently attaching the sheet on a cedar piece of a thickness of 24 mm, a width of 30 mm and a length of 500 mm so that the fiber direction of the carbon fiber might be in parallel to the fiber direction of the wood, coating the same resin as the resin used in the carbon fiber prepreg on both the faces of the board attached with the carbon fiber prepreg, and thereafter placing thereon a cedar board of the same width and length and a thickness of 3 mm, which was then heated at a pressure of 10 kg/cm$^2$ and 60° C. for 2 hours (the same pressurizing and heating conditions as those for producing the plane board of the carbon fiber resin composite material in the Example 1).

The Vf of the carbon fiber reinforced wood was 0.5%, and the wood was subject to a bending test while holding the side with the carbon fiber bonded thereto as the tensile side, and consequently, the bending strength was 73 MPa and the bending elastic modulus was 7.3 GPa. The values of the bending performance were fairly high than the 57-MPa bending strength and 6-GPa bending elasticity modulus of a glued laminated lumber recovered by similarly curing and bonding wood with no carbon fiber prepreg attached thereon by using the mixture resin used in Example 1. The individual ratios of the carbon fiber, the resin and the glued laminated lumber, occupying the resulting carbon fiber reinforced wood, are values close to values proportionally calculated and determined (referred to as theoretical values) by using the individual strengths and elasticity moduli of the carbon fiber, the resin after curing, and wood, so-the resulting carbon fiber reinforced wood was extremely great and capable of sufficiently exerting the mechanical properties of the carbon fiber. Additionally, the lamination into molds was readily carried out with no laborious works, and the time required was about one minute.

The theoretical value herein is a value determined according to the equations (1) and (2).

$$\text{Theoretical value of bending strength } (\%) = Fcfw/(Fcf \times a + Fw \times [1-a]) \times 100 \quad \text{Equation (1)}$$

wherein Fcfw is the bending strength of carbon fiber reinforced glued laminated lumber;

Fcf is the bending strength of a composite material of carbon fiber with the resin;

Fw is the bending strength of glued laminated lumber; and a is the ratio of the cross section of the carbon fiber occupying the cross section of the carbon fiber reinforced glued laminated lumber.

$$\text{Theoretical value } (\%) \text{ of bending elastic modulus} = Mcfw/(Mcf \times Mw \times [1-a]) \times 100 \quad \text{Equation (2)}$$

wherein Mcfw is the bending elastic modulus of carbon fiber reinforced glued laminated lumber;

Mcf is the bending elastic modulus of a composite material of carbon fiber with the resin;

Mw is the bending elastic modulus of glued laminated lumber; and a is the ratio of the cross section of the carbon fiber occupying the cross section of the carbon fiber reinforced glued laminated lumber.

EXAMPLE 3

The strand of a carbon fiber "Besfite (registrated trademark) HTA 12K" (Toho Rayon, Co. Ltd.) with fiber properties such as single fiber diameter of 7 microns, fiber number of 12,000, tensile strength of 3890 MPa and tensile elastic modulus of 236 GPa, continuously passed through a resin bath placing therein a mixture resin (viscosity of 35 poises at 20° C.) produced by homogeneously mixing and dissolving together 82 parts of a resol type phenol resin "AH-343" (trade name, Lignyte, Co. Ltd.) and 18 parts of a component with curing function, "D-5" (trade name, Lignyte, Co. Ltd.) containing a curing catalyst primarily comprising p-toluenesulfonic acid and a curing component at ambient temperature, at 5 m/min for an impregnation time of 0.5 minute. Then, the amount of the resin contained therein was adjusted by means of a squeeze roll to 55% by weight. Continuously following the resin impregnation process, the strand impregnated with the resin was wound, while keeping the fiber direction in parallel, around a drum of a diameter of 90 cm and with a preliminarily wound sheet of a thickness of 0.1 mm as prepared from cedar, to final width of 100 cm, followed by drying at 60° C. for one hour, to prepare the wood reinforcing carbon fiber prepreg attached wood based sheet of the present Example 3, which had the gel time of 150 minutes.

The resulting reinforcing carbon fiber prepreg attached wood based sheet was cut off from the drum and cut into rectangle pieces each of a width of 100 mm and a length of about 100 mm, and then, the pieces were laminated and placed in a mold of a depth of 3 mm, a width of 100 mm and a length of 100 mm, while aligning the sides of the carbon fiber prepreg downward, followed by heating at a pressure of 10 kg/cm$^2$ and 60° C. for 2 hours, to prepare a wood reinforcing carbon fiber composite wood based sheet of a thickness of 3 mm of the present Example 3, composed of the carbon fiber, the resin and the wood based sheet.

The carbon fiber content in the cured product of the carbon fiber prepreg in the wood reinforcing carbon fiber composite wood based sheet was 55 volume %. Herein, the "carbon fiber content in the wood reinforcing carbon fiber composite wood based sheet" means the carbon fiber volume content in the volume of the whole wood reinforcing carbon fiber composite wood based sheet minus the volume of the wood based material.

From the wood reinforcing carbon fiber composite wood based sheet was cut out a rectangular test piece of a width of 10 mm and a length of 100 mm, where the fiber direction was the lengthwise direction. The test piece was subject to the measurement of bending performance while holding the side attached with carbon fiber as the tensile side. The bending strength was 1163 MPa; the bending elastic modulus was 102 GPa; and the block shear strength was 9.6 MPa.

On contrast, the block shear strength of simple wood bonded with the same resin as used for the prepreg was 9.0 MPa, and therefore, the wood reinforcing carbon fiber composite wood based sheet of the present invention had the block shear strength similar to the strength of the glued laminated lumber with excellent adhesivity. These values correspond to 93% and 98%, respectively of the values proportionally calculated and determined (referred to as theoretical values) on the basis of the strength and elasticity modulus of the carbon fiber per se, and these values were very great values. Herein, the theoretical value is the value determined according to the equations (1) and (2).

EXAMPLE 4

A mixture resin (viscosity of 35 poises at 20° C.) recovered by homogeneously mixing and dissolving together 80 parts of resol type phenol resin "AH-343" (trade name, Lignyte, Co. Ltd.) and 20 parts of a component with curing function, "D-5" (trade name, Lignyte, Co. Ltd.) containing a curing catalyst primarily comprising p-toluenesulfonic acid and a curing agent at ambient temperature, was coated on a sheet of a thickness of 0.25 mm as prepared from cedar, by means of a coater to a final thickness of 150 g/mm$^2$. In a continuous manner to the coating process, 75 strands of a carbon fiber "Besfite (registrated trademark) HTA 6K " (Toho Rayon, Co. Ltd.) with fiber properties such as single fiber diameter of 7 microns, fiber number of 6,000, tensile strength of 3990 MPa and tensile elastic modulus of 238 GPa, were continuously arranged at an equal interval of 200 mm width along the same direction as the grain pattern direction of the cedar sheet, and continuously, the resulting matter was dried at 80° C. for 20 minutes. While placing a sheet prepared from cedar and of a thickness of 0.25 mm on the resulting sheet and pressing the entirety by means of a roll, continuously, a wood based sheet was attached on both the faces at a velocity of 3 m/min, to prepare the wood reinforcing carbon fiber prepreg attached wood based sheet of a width of 200 mm of the present Example 4.

The resulting wood reinforcing carbon fiber prepreg attached wood based sheet was cut into a rectangle piece of a width of 200 mm and a length of 2,000 mm, which was then attached on both the surfaces of a glued laminated lumber composed of six cedar sheets each of a thickness of 25 mm, a width of 200 mm and a length of 200 mm while the fiber direction was kept in parallel, the surfaces having been coated with the same resin as described above at a ratio of 150 g/m$^2$. Subsequently, the resulting material was heated and cured at a pressure of 10 kg/cm$^2$ and 60° C. for 2 hours, to prepare the carbon fiber reinforced glued laminated lumber of the present Example 4.

The resulting carbon fiber reinforced glued laminated lumber had a bending strength of 68 MPa, which was improved by 17%, compared with the strength of the glued laminated lumber prior to the reinforcement with the wood reinforcing carbon fiber prepreg attached wood based sheet of the Example 4, while the bending elastic modulus was additionally improved by 18%. Furthermore, the handleability was great, with no discharge of waste such as release paper, so the resulting lumber was excellent in terms of processability.

Furthermore, the block shear strength was measured as 10.3 MPa, and the adhesivity between the carbon fiber prepreg and the wood based sheet as well as the adhesivity between the wood based sheet and the glued laminated lumber was remarkable.

EXAMPLE 5

The strand of a carbon fiber "Besfite (registered trademark) HTA 12K " (Toho Rayon, Co. Ltd.) with fiber properties such as single fiber diameter of 7 microns, fiber number of 12,000, tensile strength of 3890 MPa and tensile elastic modulus of 236 GPa, continuously passed through a resin bath placing therein a mixture resin (viscosity of 35 poises at 20° C.) produced by mixing and dissolving together 82 parts of a resol type phenol resin "AH-343" (trade name, Lignyte, Co. Ltd.) and 18 parts of a component with curing function, "D-5" (trade name, Lignyte, Co. Ltd.) containing a curing catalyst primarily comprising p-toluenesulfonic acid and a curing agent at ambient temperature, at 5 m/min for an impregnation time of 0.5 minute. Then, the amount of the resin contained therein was adjusted by means of a squeeze roll to 55% by weight. Continuously following the resin impregnation process, the strand impregnated with the resin was wound in parallel around a drum of a diameter of 90 cm and with preliminarily wound 0.25-mm thick release paper prepared from spruce, to final width of 100 cm, while the strand impregnated with the resin might be in parallel, followed by drying at 60° C. for one hour, to prepare the wood reinforcing carbon fiber prepreg attached wood based sheet of the present Example 5.

The resulting wood reinforcing carbon fiber prepreg attached wood based sheet was cut off from the drum and was then cut into a rectangle shape of a width of 100 mm and a length of about 100 mm, and the sheet was laminated and placed in a mold of a depth of 3 mm, a width of 100 mm and a length of 100 mm while aligning the sides of the carbon fiber prepreg downward, followed by heating at a pressure of 10 kg/cm$^2$ and 60° C. for 2 hours, to prepare the wood reinforcing carbon fiber composite wood based sheet of a thickness of 3 mm of the present Example 5, comprising the carbon fiber, the resin and the wood based sheet.

The carbon fiber content in the cured product of the carbon fiber prepreg in the wood reinforcing carbon fiber composite wood based sheet was 55 volume %. From the wood reinforcing carbon fiber composite wood based sheet was cut out a rectangle test piece of a width of 10 mm and a length of 100 mm, where the fiber direction was the lengthwise direction. The test piece was subject to the measurement of bending performance while holding the side attached with carbon fiber as the tensile side. The bending strength was 863 MPa; the bending elastic modulus was 73 GPa; and the block shear strength was 10.6 MPa. These values correspond to 94% and 95%, respectively of the values proportionally calculated and determined (referred to as theoretical values) on the basis of the strength and elasticity modulus of the carbon fiber per se, and these values were very great values. Herein, the theoretical value is the value determined according to the equations (1) and (2). Comparative Example 4

In the same manner as in Example 5 except that the thickness of the spruce used in Example 5 above was modified as 2.3 mm, a wood reinforcing carbon fiber prepreg attached wood based sheet was prepared. Because the resulting wood reinforcing carbon fiber prepreg attached wood based sheet could not roll in a cylinder shape, a longer size could not be made, so the resulting sheet could not be used for reinforcing glued laminated lumbers of longer sizes.

EXAMPLE 6

In totally the same manner as in Example 4 except that a 0.25-mm thick sheet prepared from spruce was used in place of the 0.25-mm sheet prepared from cedar, the wood reinforcing carbon fiber prepreg attached wood based sheet of the present Example 6 was prepared.

The resulting wood reinforcing carbon fiber prepreg attached wood based sheet was cut into rectangle pieces of a thickness of 25 mm, a width of 200 mm and a length of 2,000 mm, which were then attached on both the surfaces of a glued laminated lumber composed of six cedar sheets each of a width of 200 mm and a length of 200 mm while the fiber direction was kept in parallel, the surfaces having been coated with the same resin as described above at a ratio of 150 g/m$^2$. Subsequently, the resulting-material was heated and cured at a pressure of 10 kg/cm$^2$ and 60° C. for 2 hours, to prepare the carbon fiber reinforced glued laminated lumber of the present Example 6.

The carbon fiber reinforced glued laminated lumber was improved of the bending strength and the bending elastic modulus, by 24% and 18%, respectively, compared with the glued laminated lumber prior to the reinforcement with the wood reinforcing carbon fiber prepreg attached wood based sheet of the Example 6, while the bending elastic modulus was additionally improved by 18%. Furthermore, the handleability was great, with no discharge of waste such as release paper, so the resulting lumber was excellent in terms of processability.

Furthermore, the block shear strength was measured as 10.5 MPa, and the adhesivity between the carbon fiber prepreg and the wood based sheet as well as the adhesivity between the wood based sheet and the glued laminated lumber was also remarkable.

EXAMPLE 7

In the same manner as in Example 3 except that a 0.03-mm thick paper made of natural cellulose was used instead of the cedar sheet used in Example 3, the wood reinforcing carbon fiber composite wood based sheet of the present Example 5 was prepared.

The carbon fiber content in the cured product of the carbon fiber prepreg of the carbon fiber composite wood based sheet was 50 volume %. From the carbon fiber composite wood based sheet was cut out a rectangular shape of a width of 10 mm and a length of 100 mm, which was used as test piece. The test piece was subject to the measurement of bending performance while holding the side attached with the carbon fiber as the tensile side. The bending strength was 1410 MPa; the bending elastic modulus was 120 GPa; and the block shear strength was 9.5 MPa. The values of the block shear strength and the bending elastic modulus correspond to 95% and 97%, respectively of the values proportionally calculated and determined (theoretical values) on the basis of the strength and elasticity modulus of the carbon fiber per se, and these values were very great values. Herein, the theoretical value is the value determined according to the equations (1) and (2). Comparative Example 5

In the same manner as in Example 7 except that the thickness of the natural cellulose paper used in Example 7 was modified as 0.005 mm, a wood reinforcing carbon fiber prepreg attached wood based sheet was prepared. The resulting wood reinforcing carbon fiber prepreg attached wood based sheet caused paper break, with much difficulty in handling.

EXAMPLE 8

In the same manner as in Example 3 except for the use of a resorcinol type resin "PR-1" (registered trade name; Aika kogyo Co. Ltd.) instead of theresol type phenol resin used in Example 3, a mixture resin was prepared. The viscosity of the mixture resin at 20° C. was 15 poises. In the same manner as in Example 3, a wood reinforcing carbon fiber prepreg attached wood based sheet was prepared by using the mixture resin. The resulting wood reinforcing carbon fiber prepreg attached wood based sheet had a gel time of 73 minutes at 30° C.

In the same manner as in Example 3, a carbon fiber composite wood based sheet was prepared by using the wood reinforcing carbon fiber prepreg attached wood based sheet recovered at the aforementioned process. The performance of the resulting carbon fiber composite wood based sheet was measured. The bending strength was 1103 MPa; the bending elastic modulus was 103 GPa; and the block shear strength was 9.5 MPa.

EXAMPLE 9

In the same manner as in Example 5 except that the thickness of the spruce used in Example 5 was modified as 1.7 mm, a rectangular test piece laminated with the carbon fiber composite wood based sheet was prepared, to measure the performance. The bending strength was 281 MPa; the bending elastic modulus was 24 GPa; and the block shear strength was 10.5 MPa. The values of the block shear strength and the bending elastic modulus correspond to 95% and 95%, respectively of the values proportionally calculated and determined (theoretical values) on the basis of the strength and elasticity modulus of the carbon fiber per se, and these values were very great values. Herein, the theoretical value is the value determined according to the equations (1) and (2).

EXAMPLE 10

In the same manner as in Example 5 except that Pork Orford cedar was used in place of the spruce used in Example 5, a rectangle test piece laminated with the carbon fiber composite wood based sheet was prepared, to measure the performance. The bending strength was 862 MPa; the bending elastic modulus was 74 GPa; and the block shear strength was 10.5 MPa. The values of the bending strength and bending elastic modulus correspond to 95% and 95%, respectively of the values proportionally calculated and determined (theoretical values) on the basis of the strength and elasticity modulus of the carbon fiber per se, and these values were very great values. Herein, the theoretical value is the value determined according to the equations (1) and (2).

As to the Examples 1 to 10 and the Comparative Examples 1 to 5, physico-chemical properties of mixture resins, prepreg sheets, carbon fiber composite materials, carbon fiber composite wood based sheets, and carbon fiber reinforced woods are comparatively shown in the following Table 1.

TABLE 1-1

|  | Example 1 | Comparative Example 1 | Comparative Example 2 | Comparative Example 3 |
|---|---|---|---|---|
| Viscosity (P) of mixture resin at 20° C. | 35 | 160 | 2 | 33 |
| Gel time (min) of prepreg sheet at 30° C. | 150 |  |  | 30 |
| Carbon fiber composite material |  |  |  |  |
| carbon fiber content (%) | 60 |  |  |  |
| bending strength (MPa) | 1634 | 830 |  | 1205 |
| bending elastic modulus (GPa) | 135 | 118 |  | 113 |
| interlaminar shear strength (MPa) | 74 | 31 |  | 32 |
| bending strength in % to theoretical value | 70 |  |  |  |
| bending elastic modulus in % to theoretical value | 95 |  |  |  |
| Carbon fiber composite wood based sheet |  |  |  |  |
| thickness (mm) of material of wood based sheet to be attached |  |  |  |  |
| carbon fiber content (%) |  |  |  |  |
| bending strength (MPa) |  |  |  |  |
| bending elastic modulus (GPa) |  |  |  |  |
| block shear strength (MPa) |  |  |  |  |

TABLE 1-1-continued

|  | Example 1 | Comparative Example 1 | Comparative Example 2 | Comparative Example 3 |
|---|---|---|---|---|
| bending strength in % to theoretical value |  |  |  |  |
| bending elastic modulus in % to theoretical value |  |  |  |  |
| Carbon fiber reinforced wood |  |  |  |  |
| thickness (mm) of material of wood to be applied |  |  |  |  |
| bending strength (MPa) or increment in % |  |  |  |  |
| bending elastic modulus (GPa) or increment in % |  |  |  |  |
| block shear strength (MPa) |  |  |  |  |

TABLE 1-2

|  | Example 2 | Example 3 | Example 4 | Example 5 | Comparative Example 4 | Example 6 |
|---|---|---|---|---|---|---|
| Viscosity (P) of mixture resin at 20° C. | 35 | 35 | 35 | 35 | 35 | 35 |
| Gel time (min) of prepreg sheet at 30° C. | 150 | 150 |  |  |  |  |
| Carbon fiber composite material |  |  |  |  |  |  |
| carbon fiber content (%) |  |  |  |  |  |  |
| bending strength (MPa) |  |  |  |  |  |  |
| bending elastic modulus (GPa) |  |  |  |  |  |  |
| interlaminar shear strength (MPa) |  |  |  |  |  |  |
| bending strength in % to theoretical value |  |  |  |  |  |  |
| bending elastic modulus in % to theoretical value |  |  |  |  |  |  |
| Carbon fiber composite wood based sheet |  |  |  |  |  |  |
| thickness (mm) of material of wood based sheet to be attached |  | cedar 0.1 | cedar 0.25*2 | spruce 0.25 | spruce 2.3 | spruce 0.25 |
| carbon fiber content (%) |  | 55 |  | 55 |  |  |
| bending strength (MPa) |  | 1163 |  | 863 |  |  |
| bending elastic modulus (GPa) |  | 102 |  | 73 |  |  |
| block shear strength (MPa) |  | 9.6 |  | 10.6 |  |  |
| bending strength in % to theoretical value |  | 93 |  | 94 |  |  |
| bending elastic modulus in % to theoretical value |  | 98 |  | 95 |  |  |
| Carbon fiber reinforced wood |  |  |  |  |  |  |
| thickness (mm) of material of wood to be applied | cedar 24 |  | cedar 25 * 6 |  |  | spruce 25 * 6 |
| bending strength (MPa) or increment in % | 73 MPa |  | 17% |  |  | 24% |
| bending elastic modulus (GPa) or increment in % | 7.3 GPa |  | 18% |  |  | 18% |
| block shear strength (MPa) |  |  |  |  |  | 10.5 |

TABLE 1-3

|  | Example 7 | Comparative Example 5 | Example 8 | Example 9 | Example 10 |
|---|---|---|---|---|---|
| Viscosity (P) of mixture resin at 20° C. | 35 | 35 | 15 | 35 | 35 |
| Gel time (min) of prepreg sheet at 30° C. |  |  | 73 |  |  |
| Carbon fiber composite material |  |  |  |  |  |
| carbon fiber content (%) |  |  |  |  |  |
| bending strength (MPa) |  |  |  |  |  |
| bending elastic modulus (GPa) |  |  |  |  |  |
| interlaminar shear strength (MPa) |  |  |  |  |  |
| bending strength in % to theoretical value |  |  |  |  |  |
| bending elastic modulus in % to theoretical value |  |  |  |  |  |
| Carbon fiber composite wood based sheet |  |  |  |  |  |
| thickness (mm) of material of wood based sheet to be attached | paper 0.03 | paper 0.005 | cedar 0.1 | spruce 1.7 | Pork Orford cedar 0.25 |
| carbon fiber content (%) | 50 |  |  |  |  |
| bending strength (MPa) | 1410 |  | 1103 | 281 | 862 |
| bending elastic modulus (GPa) | 120 |  | 103 | 24 | 74 |
| block shear strength (MPa) | 9.5 |  | 9.5 | 10.5 | 10.5 |
| bending strength in % to theoretical value | 95 |  |  | 95 | 95 |
| bending elastic modulus in % to theoretical value | 97 |  |  | 95 | 95 |
| Carbon fiber reinforced wood |  |  |  |  |  |
| thickness (mm) of material of wood to be applied |  |  |  |  |  |
| bending strength (MPa) or increment in % |  |  |  |  |  |
| bending elastic modulus (GPa) or increment in % |  |  |  |  |  |
| block shear strength (MPa) |  |  |  |  |  |

Industrial Applicability

The wood reinforcing carbon fiber prepreg of the present invention has higher strength and rigidity and great adhesivity, and it additionally has sufficient water resistance, corrosion resistance, fire resistance, thermal resistance and long shelf life, and therefore, the wood reinforcing carbon fiber prepreg can impart these functions to wood at high efficiency.

The carbon fiber prepreg attached wood based sheet of the present invention never requires any release paper for production and storage, and therefore, no release paper is discharged as waste.

Additionally, wood, a glued laminated lumber and a wood lamination product produced by laminating together the wood reinforcing carbon fiber prepreg per se, the carbon fiber prepreg attached wood based sheet, or the wood reinforcing carbon fiber composite wood based sheet produced by curing the carbon fiber prepreg attached wood based sheet, have high rigidity and strength, and therefore, various large buildings, wood bridges and domes can be produced therefrom.

Even wood conventionally never having been used due to the low strength and low rigidity can be used as wood given high strength and strength, so valuable natural resource can be effectively utilized, and the present invention is also advantageous for environmental preservation.

What is claimed is:

1. A wood reinforcing carbon fiber prepreg produced by impregnating carbon fiber sheet or strands with a resin mixture having a viscosity of 3 to 150 poises at 20° C. and a gel time of at least 50 minutes, wherein said resin mixture comprises one or more resins selected from the group consisting of resorcinol based resins and resol type phenol based resins, a curing component comprising formaldehyde and an organic or inorganic acid curing catalyst.

2. A wood reinforcing carbon fiber prepreg according to claim 1 wherein the mixture resin is in a liquid form.

3. A carbon fiber reinforced wood produced by bonding the wood reinforcing carbon fiber prepreg according to claim 1 to the wood to be reinforced.

4. A carbon fiber reinforced wood according to claim 3, wherein the wood reinforcing carbon fiber prepreg is bonded to the wood to be reinforced by heating and pressing.

5. A composite comprising a wood reinforcing carbon fiber prepreg according to claim 1 bonded on at least one face to a wood-based sheet of a thickness of 0.01 mm to 2.0 mm.

6. A composite according to claim 5, wherein the wood-based sheet is prepared from spruce or Pork Orford cedar.

7. A composite comprising a wood reinforcing carbon fiber prepreg according to claim 1 bonded on at least one surface to a wood-based sheet, wherein the wood reinforcing carbon fiber prepreg according to claim 1 is in the form of strands arranged in parallel on a surface of the wood-based sheet, said wood-based sheet having a thickness of 0.01 mm to 2.0 mm.

8. A composite according to claims further comprising a second wood-based sheet attached to the other surface of the wood reinforcing carbon fiber prepreg.

9. A composite according to claim 5 wherein the resin mixture contains one or more resins selected from resorcinol based resins and resol type phenol based resins, a curing component selected from the group consisting of curing agents comprising formaldehyde and an organic or inorganic acid curing catalyst.

10. A composite according to claim 5 wherein the wood reinforcing carbon fiber prepreg is bonded to the wood-based sheet by heating and pressing.

11. A laminate comprising a wood reinforcing carbon fiber prepreg according to claim 5 wood to be reinforced, said composite being laminated to the wood to be reinforced by heating and pressing against a surface of solid wood or surface of a glued laminated lumber or by insertion between plural wood laminae to form an assembly, and heating and pressing the assembly.

12. A laminate of the composite according to claim 10 and wood to be reinforced , said composite being laminated to the wood to be reinforced by heating and pressing against a surface of solid wood or of a glued laminated lumber or by insertion between plural wood laminae to form an assembly, and heating and pressing the assembly.

* * * * *

UNITED STATES PATENT AND TRADEMARK OFFICE
CERTIFICATE OF CORRECTION

PATENT NO. : 6,287,677 B1
DATED : September 11, 2001
INVENTOR(S) : Shigehisa Ishihara et al.

It is certified that error appears in the above-identified patent and that said Letters Patent is hereby corrected as shown below:

Delete title pages and substitute therefore the attached title pages.

Delete Columns 1-22 and substitute therefore the attached Columns 1-18.

Signed and Sealed this

Eighteenth Day of November, 2003

JAMES E. ROGAN
*Director of the United States Patent and Trademark Office*

(12) United States Patent
Ishihara et al.

(10) Patent No.: US 6,287,677 B1
(45) Date of Patent: Sep. 11, 2001

(54) CARBON FIBER PREPEG FOR WOOD REINFORCEMENT, WOODEN SHEET LAMINATED THEREWITH, WOOD REINFORCING COMPOSITE COMPRISING CARBON FIBERS AND THE WOODEN SHEET, AND CARBON FIBER REINFORCED WOOD

(75) Inventors: Shigehisa Ishihara, 23-12, Tenjin 3-chome, Nagaokakyo, Kyoto 617; Hiroyasu Ogawa, Tokyo; Yoshihiro Endoh, Shizuoka; Isamu Ide, Osaka; Hideo Getto, Aichi; Satoshi Saito, Nagano, all of (JP)

(73) Assignees: Toho Rayon Co., Ltd.; Shigehisa Ishihara; Lignyte Co., Ltd.; Aica Kogyo Co., Ltd. all of (JP)

(*) Notice: Subject to any disclaimer, the term of this patent is extended or adjusted under 35 U.S.C. 154(b) by 0 days.

(21) Appl. No.: 09/142,695
(22) PCT Filed: Mar. 21, 1997
(86) PCT No.: PCT/JP97/00950
    § 371 Date: Sep. 14, 1998
    § 102(e) Date: Sep. 14, 1998
(87) PCT Pub. No.: WO97/35911
    PCT Pub. Date: Oct. 2, 1997

(30) Foreign Application Priority Data

Mar. 22, 1996 (JP) ................................. 8-093566
Mar. 22, 1996 (JP) ................................. 8-093567

(51) Int. Cl.$^7$ ............................................. B32B 21/10
(52) U.S. Cl. .............................. 428/292.1; 428/292.4; 428/299.1; 428/300.7; 428/301.4; 428/537.1
(58) Field of Search .......................... 428/292.4, 292.1, 428/299.1, 300.7, 301.4, 537.1

(56) References Cited

U.S. PATENT DOCUMENTS 4,061,620 * 12/1977 Gillern .

FOREIGN PATENT DOCUMENTS 53108182   9/1978 (JP) .
54066973 * 5/1979 (JP) .

(List continued on next page.)

OTHER PUBLICATIONS

Chang et al, Journal of Applied Polymer Science, vol. 27, pp. 4759–4772 (1982).
Chemicl General Remarks No. 8 & English language translation of Table 8.

*Primary Examiner*—Elizabeth M. Cole
(74) *Attorney, Agent, or Firm*—Lorusso & Loud

(57) ABSTRACT

The present invention provides a wood reinforcing carbon fiber prepreg, which is produced through impregnation with a resin mixture at a viscosity of 3 to 150 poises at 20° C., wherein the resin mixture contains one or more resins selected from resorcinol based resins and resol type phenol based resins, formaldehydes as curing agents and inorganic acids or organic acids as curing catalysts. The wood reinforcing carbon fiber prepreg has a prolonged shelf life and is capable of imparting the rigidity and elastic modulus of carbon fiber to the wood to be reinforced at a high ratio. The present invention also provides a wood reinforcing carbon fiber prepreg/wood composite sheet, wherein a wood based sheet of a thickness of 0.01 mm to 0.06 mm is bonded to at least one face of a carbon fiber prepreg sheet produced through impregnation with the resin mixture containing a thermosetting resin and a curing agent or a curing catalyst. The carbon fiber prepreg sheets, and carbon fiber composites have excellent adhesivity and handleability, do not generate waste when applied to wood and glued laminated lumbers, and impart the rigidity and elastic modulus of carbon fiber to the wood which is reinforced at a high ratio.

12 Claims, 2 Drawing Sheets

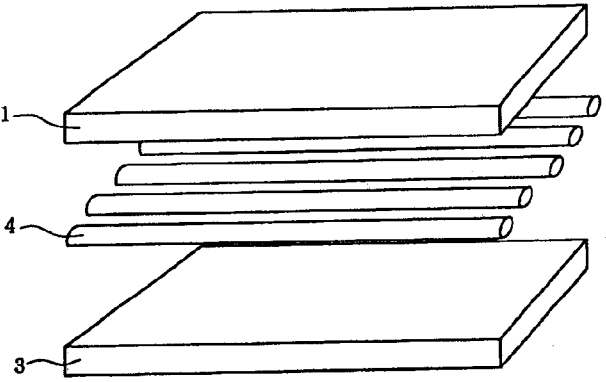

FOREIGN PATENT DOCUMENTS

| | | |
|---|---|---|
| 3230904 | 2/1990 | (JP). |
| 4215840 | 8/1992 | (JP). |
| 6-49161 | 2/1994 | (JP). |
| 6122178 | 5/1994 | (JP). |
| 8-25574 | 1/1996 | (JP). |

* cited by examiner

CARBON FIBER PREPEG FOR WOOD REINFORCEMENT, WOODEN SHEET LAMINATED THEREWITH, WOOD REINFORCING COMPOSITE COMPRISING CARBON FIBERS AND THE WOODEN SHEET, AND CARBON FIBER REINFORCED WOOD

TECHNICAL FIELD

The present invention relates to a wood reinforcing carbon fiber prepreg, and a carbon fiber reinforced wood, i.e. wood reinforced through the adhesion of the carbon fiber prepreg thereto. More specifically, the present invention relates to a wood reinforcing carbon fiber prepreg wherein a specific matrix resin with excellent wood adhesivity is impregnated into a carbon fiber, and to a carbon fiber reinforced wood produced by integrally attaching the carbon fiber prepreg to the surface of wood or to the surface of a glued laminated lumber, or between laminae composing a laminated lumber or between single laminae.

BACKGROUND ART

Woods and wood composites such as solid wood and glued laminated lumber and the like have conventionally been used primarily as framing structures such as column and beam in buildings. In recent years attempts have been made to apply solid woods and laminated lumber to large scale constructions such as wood bridges and large-scale domes. Glued, laminated lumber is produced by arranging laminae or small square pieces, preliminarily cut in longer lengths, in parallel along the fiber direction and thereafter laminating them together vertically or arranging them horizontally and bonding them together with adhesives. Glued laminated lumber is less restricted than solid woods with regard to dimension and shape, less varied in product strength, less likely to crack and warp during drying and has good advantages such as ready production of curved structures.

So as to impart sufficient rigidity and strength to woods such as solid wood and glued laminated lumber if used for large-scale buildings and constructions, however, a large thickness is required.

As a wood material with enhanced rigidity and strength but without enlarged thickness, it has recently been proposed to use carbon fiber reinforced wood and carbon fiber reinforced glued laminated lumber, which materials are produced by bonding carbon fiber through adhesives to solid wood and to glued laminated lumber, respectively.

For example, Japanese Patent Laid-open No. Hei 3-230904 discloses a process comprising arranging carbon fiber on the surface of wood coated with an adhesive, thereby impregnating the adhesive into the fiber and bonding the wood together. Additionally, Japanese Patent Laid-open No. Sho 53-108182 discloses a process comprising preliminarily impregnating carbon fiber with an adhesive to prepare a carbon fiber prepreg, which is then bonded to wood to reinforce the wood.

In the so-called composite materials reinforced with carbon fiber, epoxy resins are frequently used as the matrix resins. However, epoxy resins have a drawback of extremely poor thermal resistance and fire resistance, although the resins have extremely good adhesiveness to carbon fiber. Hence, wood reinforced with composite materials produced by using epoxy resins cannot provide the thermal resistance and fire resistance required for large scale buildings and other large scale constructions.

Attempts have been made in recent years to reinforce wood or glued laminated lumbers with composite materials comprising carbon fiber and matrix resins. As the adhesive material (matrix resin) to be used for such composite materials, resins such as phenol-based resins and resorcin based resins are used.

These resins are said to have sufficient water resistance, corrosion resistance, fire resistance and thermal resistance required for wood buildings and constructions and to be effective for adhesion between woods.

When these matrix resins are used to prepare a carbon fiber prepreg, however, there have been the following problems: a problem of poor adhesivity between carbon fiber and the matrix resins; a problem of poor adhesivity between carbon fiber and wood; a problem of poor fluidity of the matrix resins during the adhesion to wood; and a problem of extreme difficulty in preparing a prepreg with a long shelf life, i.e. a long usable life, which is consistent in plant production under controls.

Furthermore, a conventional carbon fiber prepreg is poor in adhesivity to wood and, therefore, the resulting carbon fiber reinforced wood and laminated lumber have low rigidity and strength regardless of the amount of the carbon fiber used therein, so that expensive carbon fiber is used in a greater amount than necessary and is not efficiently used.

Moreover, when conventional carbon fiber prepreg is bonded to wood, the bonded layer tends to disadvantageously peel off during use.

When adhering a carbon fiber prepreg to wood, the adhesivity varies because wood is a natural product having variable properties, depending on the wood species, the growing environment and other factors. So as to procure adhesivity, furthermore, laborious adjustments are needed, including the selection and adjustment of the matrix resins to be used for such prepreg, namely solid, semi-solid or liquid state, as well as the amount thereof, so that economic and quality problems have been present. So as to roll a carbon fiber prepreg into a roll or to stack the prepreg in sheet form for delivery or storage, furthermore, release paper is arranged on one face or both the faces of the prepreg so as to avoid the adhesion between the sheets or plies, but the laborious and time consuming process of removal of the release paper when the prepreg is attached to wood becomes necessary, and is problematical and the removed release paper becomes waste causing environmental pollution.

SUMMARY OF THE INVENTION

The present inventors have found that the foregoing problems can be overcome by preparing a carbon fiber prepreg using a resin mixture containing a specific matrix resin, a specific curing agent and a specific curing catalyst. In another aspect, the present invention utilizes a specific carbon fiber sheet.

In other words, one object of the present invention to provide a carbon fiber prepreg having excellent adhesivity and a longer usable time such that the prepreg can be bonded to wood or glued laminated lumbers for use and imparting the elasticity modulus and strength of the carbon fiber to wood and glued laminated lumbers at a higher ratio. It is the other object of the present invention to provide wood, a glued laminated lumber and a wood laminated material having high rigidity and strength due to the carbon fiber prepreg adhered thereto.

The carbon fiber prepreg is a carbon fiber sheet or a carbon fiber strand prepreg with excellent adhesivity, handleability and processability, the use of which does not give rise to any occurrence of environmental pollution, and which sheet can be bonded to wood and glued laminated lumbers by curing the sheet.

Other objects of the present invention are to enlarge the utility of wood in large scale buildings and other constructions and to reduce the amount of natural wood to be used in, and thereby reducing the weight of, the resulting buildings and constructions.

More specifically, the present invention provides a wood reinforcing carbon fiber prepreg, which is produced by impregnating a carbon fiber with a resin mixture having a viscosity of 3 to 150 poise at 20° C., wherein the resin mixture contains one or more of matrix resins selected from resorcinol based resins and resol type phenol based resins, and a curing component selected from curing agents comprising formaldehydes and one or more curing catalysts selected from inorganic acids and organic acids.

The gel time of the resin mixture used in the present invention at 30° C. is characteristically 50 minutes or more and is characteristically in a liquid form.

Another embodiment of the present invention is a carbon fiber reinforced wood, produced by making a combination of the wood reinforcing carbon fiber prepreg with wood to be reinforced, and pressing and integrating them together. The wood reinforcing carbon fiber prepreg is used by bonding to a surface of solid wood, by bonding to a surface of glued laminated lumber and by inserting the prepreg between plural laminae. The means for integrating the wood reinforcing carbon fiber prepreg with wood to be reinforced may satisfactorily be pressing in combination with heating.

The second embodiment of the present invention is a wood reinforcing carbon fiber prepreg/woodbased sheet composite, wherein a wood based sheet of a thickness of 0.01 mm to 2.0 mm is bonded to at least one face of a wood reinforcing carbon fiber prepreg of the above-described first embodiment of the present invention.

In another embodiment, the present invention provides a composite wood based sheet, produced by integration of the wood reinforcing carbon fiber prepreg with a wood based sheet under heating and pressurization.

The wood reinforcing carbon fiber prepreg is attached on the surface of wood or attached on the surface of a glued laminated lumber or inserted between plural laminae, to produce a carbon fiber reinforced wood composite.

The terms "wood" or "solid wood" in the present Specification means wood of an appropriate shape after processing such as cutting out from natural wood and after a treatment such as chemical treatment if necessary.

The terminology "glued laminated lumber," as used in the Specification, means lumber produced by overlaying laminae or small square timbers cut in long lengths along the fiber directions and arranged in parallel to each other, and thereafter bonded together with adhesives.

The terminology "wood based material" as used in the Specification means wood per se, glued laminated lumber per se, or wood such as wood or glued laminated lumber mixed with or laminated with a material of a different type.

The terminology "strand prepreg" or "strand of prepreg" in the Specification means strand impregnated with a resin.

The terminology "prepreg sheet" in the Specification means prepreg in a sheet shape, including for example a sheet produced by winding a carbon fiber strand on a drum while impregnating the carbon fiber strand with a resin, simultaneously enlarging the width of the carbon fiber strand to integrate them together and cutting the resulting integrated product along the drum axial direction.

The term "composite" in the present Specification means a matrix resin comprising a different material, after curing and integration.

Suitable matrix resins to be used in the present invention include known resol type phenol based resins (resins of phenols and formaldehyde produced by condensation), as produced by reacting a methyrol selected from phenols with one phenolic hydroxyl group, such as phenol, cresol, xylenol, ethyl phenol, chlorophenol, and bromophenol or oligomers and phenols with two phenolic hydroxyl groups, such as resorcin, hydroquinone catechol, and chloroglycinol, and aldehydes such as formaldehyde, p-formalhyde, acetoaldehyde, furfural, benzaldehyde, trioxane, and tetraoxane, at a molar ratio of phenols/aldehydes 2/1 to 1/3, preferably 5/4 to 2/5 in the presence of an alkali catalyst, such as potassium hydroxide or sodium hydroxide; and resorcinol resins.

The molecular weight of the matrix resin to be used in accordance with the present invention is preferably 100 to 2,000, particularly preferably 150 to 500 as an average molecular weight on a polystyrene basis, as determined by high performance liquid chromatography (HPLC).

As organic curing agents, formaldehyde, acetoaldehyde, furfural, benzaldehyde, trioxane and tetraoxane are preferable among known resorcinol resins and resol based phenolic resins of paste or liquid properties when mixed with the matrix resin and for use as curing agents.

Suitable curing catalysts include organic acids such as p-toluenesulfonic acid, benzenesulfonic acid, xylenesulfonic acid and phenolsulfonic acid or inorganic acids such as sulfuric acid, nitric acid and sulfuric acid are preferable. These acids are dissolved in a liquid state when mixed with the matrix resin.

So as to homogeneously cure the prepreg, additionally, preference is given to a curing agent which has a homogeneous liquid state at temperatures up to 35° C., used as routine prepreg preparation temperatures.

From the viewpoint of adhesivity, the carbon fiber to be used in the present invention is preferably, but not limited to, a carbon fiber with a nitrogen content of 0.1 to 15% by weight, a tensile strength of 2500 to 7000 MPa and an elasticity modulus of 150 to 700 GPa, as produced from polyacrylonitrile based fiber, particularly a carbon fiber of a diameter of 5 to 9 Mm and with a nitrogen content of 3 to 10% by weight, tensile strength of 3500 MPa or more and an elasticity modulus of 250 to 350 GPa.

Preferably, to enhance adhesive strength, the surface oxygen/carbon is 0.1/1 to 0.3/1, more preferably 0.15/1 to 0.25/1 (on the surface of the carbon fiber) as determined by ESCA surface analyzer (Shimadzu, Co.).

The carbon fiber to be used in accordance with the present invention is of a fiber diameter of 5 to 9 microns, and a desired number of fiber bundles, each of 1000 to 300,000 fibers (strand), are bundled or are enlarged into a sheet form for subsequent use.

The wood reinforcing carbon fiber prepreg in accordance with the present invention may be in a form of a strand prepreg or a prepreg sheet. Strand prepreg is produced by continuously dipping the strand of carbon fiber in a resin mixture produced by mixing at least one of the resins, formaldehyde as a curing agent or inorganic acids or organic acids as curing catalysts, and inorganic fillers, if necessary, to impregnate.the strand with the resin mixture at a final concentration of 30 to 80% by weight of the resin mixture to carbon fiber, and thereafter drying to drive off the volatile components and produce the prepreg.

Additionally, prepreg sheets are prepared by using known means comprising winding the carbon fiber strand over a drum so that the winds of fiber are in parallel to each other or comprising arranging the carbon fiber strands in parallel, and pressing the thus-arranged strands with a roll against a resin membrane of release paper preliminarily coated with the matrix resin to permeate the resin into the fiber.

When the carbon fiber strand is used as a reinforcing material in producing the wood reinforcing carbon fiber prepreg in accordance with the present invention, the strand can be handled by known methods comprising deposition of powdery inorganic matters such as talc on the surface or arranging release paper on one face or both the faces if the reinforcing material is a carbon fiber sheet.

The resin mixture to be used in accordance with the present invention is required to be a homogeneous solution for homogeneous impregnation and homogenous curing of carbon fiber. Unless the solution is homogenous, the resulting prepreg is poorly cured or has low adhesion. If the amount of the resin mixture in the prepreg impregnated with the resin mixture is not more than 30% by weight, the prepreg is poorly adhesive to wood; if above 80% by weight, the prepreg is handled with much difficulty, such that the resin might fall from the prepreg. Particularly, 40 to 60% by weight is preferable for adhesivity and handleability of the prepreg.

The viscosity of the resin mixture to be used in accordance with the present invention is preferably 3 to 150 poises at 20° C.; particularly, a viscosity of 50 to 100 poises is preferred for shape retention and handleability of the prepreg. If the viscosity is 3 poises or less, the resin readily falls out of the prepreg; if the viscosity is more than 150 poises, the impregnation of the resin into the carbon fiber is so poor that the bending strength, bending elasticity modulus and interlaminar shear strength and the like are lowered when the prepreg is made into a carbon fiber resin composite material, which disadvantageously affects the mechanical performance. The viscosity may be satisfactorily adjusted by adding water.

Furthermore, the gel time of the prepreg impregnated with the resin mixture is preferably 50 minutes or more at 30° C.; if below 50 minutes, the prepreg may be cured during the transfer of the prepreg to customers or may be cured gradually at −20° C., a routine storage condition, so the prepreg cannot be stored even for one to two weeks.

The wood and glued laminated lumber in accordance with the present invention are commercially available woods, without any specific limitation, such as wood and glued laminated lumber used in buildings, including cedar, cypress, larch, American pine, spruce; and woods used in plywoods, such as oak, paulownia, keyaki, maple, horse chestnut, Magnolia hypoleuca, cherry, teak, lauan, spinarl and others.

The sheet of the carbon fiber prepreg or the strand of the carbon fiber prepreg in accordance with the present invention may be bonded to wood and glued laminated lumbers as follows.

More specifically, after the resin to be used in accordance with the present invention is mixed with a curing agent or inorganic acids or organic acids as curing catalysts, the resin mixture is preferably coated on the surface of the wood or glued laminated lumber and on the surface of a thin lamina for glued laminated lumber, and the carbon fiber prepreg (sheet or strand) is adhered to the coated surface so that the direction of the carbon fiber is parallel to the fiber direction of the wood.

For thin laminae of glued laminated lumber, additionally, a thin lamina attached with the carbon fiber prepreg is laminated through an adhesive on several other thin laminae of glued laminated lumber by a known process, and is then heated at a pressure of 1 to 15 kg/cm$^2$ and at a temperature of ambient temperature to 120° C. for 5 to 24 hours.

After bonding the carbon fiber prepreg on the surface of wood or glued laminated lumber to prepare a wood based surface, other thin wood and wood based thin sheets may satisfactorily be bonded to the outer surface of the carbon fiber prepreg.

The carbon fiber reinforced wood of the present invention may be used as general use wood and glued laminated lumber and the wood is particularly preferable for large scale buildings such as schools, gymnasiums, lecture halls, various indoor ball game stadiums, and domes; and may also be used as framing material for houses of three stories or more and wood bridges.

In another embodiment of the present invention, wood based sheet is used instead of the release paper used in the first described embodiment, and the wood based sheet is integrated with the wood reinforcing carbon fiber prepreg and is finally integrated with the wood to be reinforced. More specifically, on at least one face of the wood reinforcing carbon fiber prepreg produced by impregnation with a resin mixture containing a thermosetting resin and a curing component is arranged a wood based sheet of a thickness of 0.01 to 2.0 mm. For handling as a roll, the thickness of the wood based sheet is preferably 0.05 to 0.3 mm.

In one embodiment of the present invention, the wood. reinforcing carbon fiber prepreg, with one face attached to a wood based sheet, is prepared by mixing one or more of the resins, a curing agent or a curing catalyst and an inorganic filler and the like together, continuously dipping a strand of carbon fiber in the resulting liquid resin mixture to impregnate the carbon fiber strand with the resins to 30 to 80% by weight, drying if necessary, winding the fiber in winds parallel to each other on a wood based sheet preliminarily wound around a drum, drying the fiber if necessary and subsequently cutting the fiber along the width direction of the drum. Alternatively, the prepreg/wood based sheet is prepared by permeating the resin into the fiber with the carbon fiber strands arranged in parallel on a wood based sheet and the surface preliminarily coated with the resin, and applying pressure by means of a roll.

Another embodiment of the present invention is a wood based sheet with both the faces having an adhering carbon fiber prepreg.

The wood based sheet with the adhering carbon fiber strand prepreg according to the present invention is prepared with spaces between the carbon fibers. Impregnation is conducted so that the resin mixture is 30 to 80% by weight, and thereafter, the volatile matter is driven off by drying, and if necessary, powdery inorganic matters such as talc are deposited on the surface to prepare a carbon fiber strand prepreg, which is then wound on the wood based sheet preliminarily wound around a drum with the carbon fiber forming parallel winds, to prepare the wood based sheet attached to the carbon fiber strand prepreg. Alternatively, the carbon fiber strand is arranged in parallel on the wood based sheet under pressure by means of a roll and if necessary, another wood based sheet is attached on the other, exposed side of the carbon fiber strand, to prepare a sheet of the carbon fiber strand prepreg attached to wood based sheets on both faces thereof.

The wood based sheet to be used in the foregoing embodiment of the present invention includes commercially available natural woods such as dao, oak, birch, cypress, cedar, cherry, maple, teak, pine, Pork Orford cedar and spruce, prepared as thin slices by conventional slicers or paper, non-woven fabric, or fiber sheet produced from wood based pulp. Spruce and Pork Orford cedar in particular are preferred, because when these woods are attached to the carbon fiber prepreg in the first embodiment of the present invention, and subsequently bonded to wood, they impart high adhesivity and mechanical performance and show excellent resistance against release after boiling in water. Preferably, the thickness is 0.01 to 0.6 mm. If the thickness is less than 0.01 mm, the sheet performance is poor across the width of the carbon fiber prepreg, causing difficulty in handling thereof. If, on the other hand, the thickness is above 0.6 mm, the flexibility is lowered, resulting in loss of post-forming processability. Particularly, 0.3 mm is preferable from the viewpoint of flexibility.

BRIEF DESCRIPTION OF THE DRAWINGS

Figure 2:
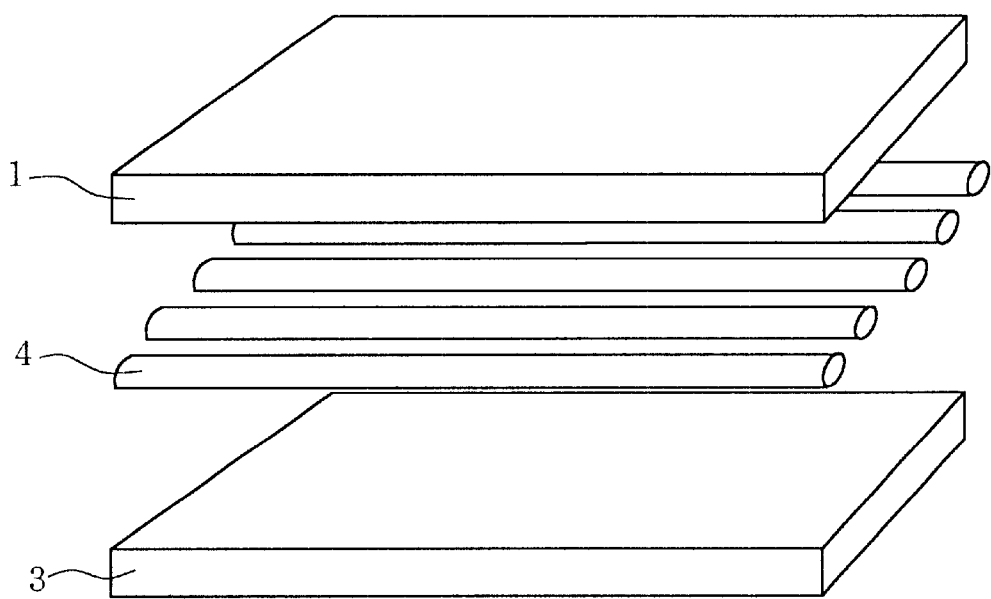
FIG. 2 depicts one example of the lamination state of the wood reinforcing carbon fiber prepreg attached wood based sheet in the second group of the present invention, wherein wood based sheets 1, 3 are attached to both the sides of carbon fiber strand prepreg 4 to laminate together.
Figure 3:
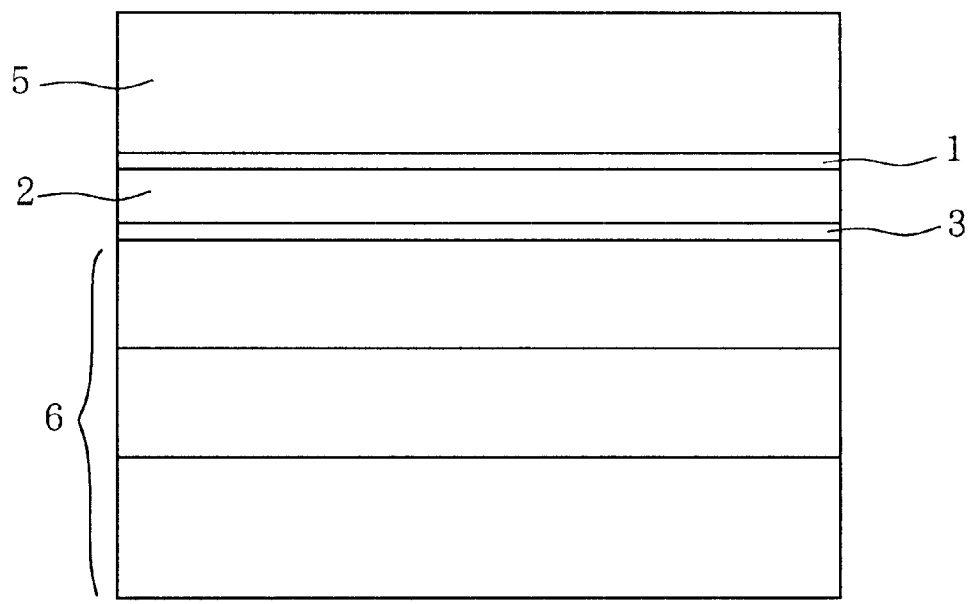
FIG. 3 is a cross sectional view of the lamination state of the carbon fiber reinforced wood in the second group of the present invention, which is produced by laminating wood 5 on one side of the wood reinforcing carbon fiber prepreg attached wood based sheet of FIG. 1 and then laminating glued laminated lumber 6 on the other side thereof.

FIG. 1 depicts one example of a composite sheet of the present invention, wherein wood based sheets 1, 3 are attached to both the sides of a carbon fiber prepreg sheet 2 and laminated together;

FIG. 2 depicts another embodiment of the present invention, wherein wood based sheets 1, 3 are attached to both the sides of a carbon fiber strand prepreg 4 and laminated together; and FIG. 3 is a cross sectional view of yet another embodiment of the present invention, which is produced by laminating wood 5 on one side of the wood/reinforcing carbon fiber prepreg composite sheet of FIG. 1 and then laminating glued laminated lumber 6 on the other side thereof.

DESCRIPTION OF THE PREFERRED EMBODIMENTS

The present invention will now be described in detail in the following examples, but the invention is not limited thereto.

The gel time as used herein is that time required to reach the maximum torque when the curing of the resin mixture containing a resin and a curing agent to be used for the carbon fiber prepreg is measured by using a Curast Meter (Nippon Synthetic Rubber, Co.).

Furthermore, the bending performance and interlaminar shear strength of the carbon fiber resin composite material were measured and determined according to JIS K7074 and JIS K7078, respectively, and the viscosity was determined by using a Rheometer (Rheometrics, Co.). Additionally, the bending elastic modulus and bending strength of wood and glued laminated lumber and carbon fiber reinforced wood and glued laminated lumber thereof were measured according to JIS Z2101. Block shear strength was determined according to JAS Standard, Article No. 3 concerning structural glued laminated lumbers with large cross sections.

EXAMPLE 1

Strand of a carbon fiber "Besfite (registered trademark) HTA 12K" (Toho Rayon, Co. Ltd.) with a single fiber diameter of 7 microns, fiber number of 12,000, tensile strength of 3890 MPa and tensile elastic modulus of 236 GPa, was continuously passed through a resin bath containing a resin mixture (viscosity of 35 poises at 20° C.) produced by homogeneously mixing and dissolving together 82 parts of a resol type phenol resin "AH-343" (trade name of Lignyte, Co.Ltd.) and 18 parts of a component with curing function, "D-5" (trade name of Lignyte, Co. Ltd.) containing a curing catalyst primarily comprising p-toluenesulfonic acid and a curing agent at ambient temperature, at 3 m/min for an impregnation time of one minute. Then, the amount of the resin contained therein was adjusted by means of a squeeze roll to 45% by weight. Continuously following the resin impregnation process, the strand impregnated with the resin was wound in parallel around a drum of a diameter of 90 cm covered with a preliminarily wound release paper, to a final width of 100 cm, followed by drying at 60° C. for one hour, to prepare the wood reinforcing carbon fiber prepreg of the present Example 1.

The resulting wood reinforcing carbon fiber prepreg was cut off from the drum, to prepare a carbon fiber prepreg sheet with a carbon fiber weight of 300 g/m$^2$, a width of 100 cm, a length of about 2.8 m, and a gel time of 150 minutes at 30° C.

The carbon fiber prepreg sheet was placed in a mold of a depth of 3 mm, a width of 100 mm and a length of 100 mm, while keeping the fiber direction in parallel and laminating the sheet together, for curing under heating at a pressure of 10 kg/cm$^2$ and 60° C. for 2 hours, to prepare a 3-mm thick planar board of a carbon fiber resin composite material. From the planar board was cut out a rectangle test piece of a width of 10 mm and a length of 100 mm along the fiber direction which was along the lengthwise direction, to measure the bending performance. The content of the carbon fiber in the composite material was 60% by volume; the bending strength, 1634 MPa; the bending elastic modulus, 135 GPa; and the interlaminar shear strength, 74 MPa. These values corresponded to 70% and 95% [percentage of (strength or elastic modulus of carbon fiber)×carbon fiber content], respectively on the basis of the strength and elastic modulus of the carbon fiber per se and the carbon fiber content, which were very high values.

COMPARATIVE EXAMPLE 1

In the same manner as in Example 1, except for the use of paraformaldehyde of an average grain size of 1 Mm instead of the curing agent used in Example 1, a resin mixture (viscosity of about 160 poises at 20° C.) was recovered, which was then used for impregnation to prepare a board of a carbon fiber resin composite material. In the same manner as in Example 1, the board performance was measured. The bending strength was 830 MPa; the bending elastic modulus was 118 GPa and the interlaminar shear strength was as low as 31 MPa.

COMPARATIVE EXAMPLE 2

In the same manner as in Example 1, except for the use of a low molecular weight compound (molecular weight of 90) instead of the resol type phenol resin used in the Example 1, a resin mixture was prepared. The viscosity of the resin mixture at 20° C. was 2 poises.

In the same manner as in Example 1, a carbon fiber prepreg was prepared at 20° C. from the resin mixture, and then, the resin flowed out of the resulting prepreg during handling, so that it was difficult to maintain the predetermined resin amount. Additionally, a planar board of a carbon fiber resin composite material was produced by using the carbon fiber prepreg in the same manner as in Example 1, and a considerable amount of the resin flowed out during molding, so that a planar board of a desired carbon fiber content could not be produced.

COMPARATIVE EXAMPLE 3

In the same manner as in Example 1, except for the use of formaldehyde instead of the curing agent used in the Example 1, a resin mixture was produced. The viscosity of the resin mixture at 20° C. was 33 poises, while the gel time of the resin mixture was 30 minutes.

When a carbon fiber prepreg was prepared by using the resin mixture in the same manner as in Example 1, curing progressed in the drying process, so that a prepreg of a board shape with no flexibility resulted. By using the resulting board, a planar board of a carbon fiber composite material was prepared in the same manner as in the Example 1. The planar board was poor in terms of bending strength, bending elastic modulus and interlaminar shear strength, which were as low as 1205 MPa, 113 GPa and 32 MPa, respectively.

EXAMPLE 2

A carbon fiber reinforced wood was prepared by peeling off the release paper from one sheet of the wood reinforcing carbon fiber prepreg recovered in the aforementioned Example 1 and subsequently attaching the sheet on a piece of cedar of a thickness of 24 mm, a width of 30 mm and a length of 500 mm so that the fiber direction of the carbon fiber was in parallel with the fiber direction of the wood, coating the same resin as used in the carbon fiber prepreg on both faces of the board attached to the carbon fiber prepreg, and thereafter placing thereon a cedar board of the same width and length and a thickness of 3 mm, which was then heated at a pressure of 10 kg/cm$^2$ and 60° C. for 2 hours (the same pressure and heating conditions as those used to produce the planar board of the carbon fiber resin composite material in Example 1).

The Vf of the carbon fiber reinforced wood was 0.5%, and the wood was subject to a bending test while holding the side with the carbon fiber bonded thereto as the tensile side, and consequently, the bending strength was 73 MPa and the bending elastic modulus was 7.3 GPa. The values for the bending performance were higher than the 57-MPa bending strength and 6-GPa bending elasticity modulus of a glued laminated lumber produced by similarly curing and bonding wood with no carbon fiber prepreg attached thereon by using the resin mixture used in Example 1. The individual ratios of the carbon fiber, the resin and the glued laminated lumber, incorporated into the resulting carbon fiber reinforced wood, are values proportionally calculated and determined (referred to as theoretical values) by using the individual strengths and elasticity modulus of the carbon fiber, the resin after curing, and wood, so that the resulting carbon fiber reinforced wood exhibited the mechanical properties of the carbon fiber. Additionally, the lamination in molds was readily carried out without laborious work and the time required was about one minute.

The theoretical value herein is a value determined according to the equations (1) and (2).

Theoretical value of bending strength $$(\%) = Fcfw/(Fcf \times a + Fw \times [1-a]) \times 100 \quad \text{[Equation (1)]}$$

wherein Fcfw is the bending strength of the carbon fiber reinforced glued laminated lumber;

Fcf is the bending strength of a composite of carbon fiber with the resin;

Fw is the bending strength of glued laminated lumber; and a is the ratio of the cross-section of the carbon fiber occupying the cross-section of the carbon fiber reinforced glued laminated lumber.

Theoretical value (%) of bending elastic modulus $$= Mcfw/(Mcf \times Mw \times [1-a]) \times 100 \quad \text{[Equation (2)]}$$

wherein Mcfw is the bending elastic modulus of carbon fiber reinforced glued laminated lumber;

Mcf is the bending elastic modulus of a composite of carbon fiber with the resin;

Mw is the bending elastic modulus of the glued laminated lumber; and a is the ratio of the cross section of the carbon fiber occupying the cross section of the carbon fiber reinforced glued laminated lumber.

EXAMPLE 3

Carbon fiber strand "Besfite (registrated trademark) HTA 12K" (Toho Rayon, Co. Ltd.) with a single fiber diameter of 7 microns, fiber number of 12,000, tensile strength of 3890 MPa and tensile elastic modulus of 236 GPa, was continuously passed through a resin bath containing a resin mixture (viscosity of 35 poises at 20° C.) produced by homogeneously mixing and dissolving together 82 parts of a resol type phenol resin "AH-343" (trade name of Lignyte, Co. Ltd.) and 18 parts of a component with curing function, "D-5" (trade name of Lignyte, Co. Ltd.) containing a curing catalyst primarily comprising p-toluenesulfonic acid and a curing component at ambient temperature, at 5 m/min for an impregnation time of 0.5 minute. Then, the amount of the resin contained therein was adjusted by means of a squeeze roll to 55% by weight. Continuously following the resin impregnation process, the strand impregnated with the resin was wound, while keeping the fiber direction in parallel, around a drum of a diameter of 90 cm carrying prewound sheet of cedar of a thickness of 0.1 mm, to a final width of 100 cm, followed by drying at 60° C. for one hour, to prepare the wood reinforcing carbon fiber prepreg/wood composite sheet, which had a gel time of 150 minutes.

The resulting reinforcing carbon fiber prepreg and wood based sheet composite was cut off from the drum and cut into rectangle pieces each of a width of 100 mm and a length of about 100 mm, and then, the pieces were laminated and placed in a mold of a depth of 3 mm, a width of 100 mm and a length of 100 mm, while aligning the sides of the carbon fiber prepreg downward, followed by heating at a pressure of 10 kg/cm$^2$ and 60° C. for 2 hours, to prepare a wood reinforcing carbon fiber composite wood based sheet of a thickness of 3 mm, composed of the carbon fiber, the resin and the wood based sheet.

The carbon fiber content in the cured product of the carbon fiber prepreg in the wood reinforcing carbon fiber composite wood based sheet was 55 volume %. Herein, the "carbon fiber content in the wood reinforcing carbon fiber composite wood based sheet" means the carbon fiber volume content in the volume of the whole wood reinforcing carbon fiber composite wood based sheet minus the volume of the wood based material.

From the wood/reinforcing carbon fiber composite sheet was cut out a rectangular test piece of a width of 10 mm and a length of 100 mm, wherein the fiber direction was the lengthwise direction. The test piece was subjected to the measurement of bending performance while holding the side attached with carbon fiber as the tensile side. The bending strength was 1163 MPa; the bending elastic modulus was 102 GPa; and the block shear strength was 9.6 MPa.

In contrast, the block shear strength of simple wood bonded with the same resin as used for the prepreg was 9.0 MPa, and therefore, the wood/reinforcing carbon fiber composite sheet of the present invention had a block shear strength similar to the strength of the glued laminated lumber and shows excellent adhesivity. These values correspond to 93% and 98%, respectively, of the values proportionally calculated and determined (referred to as theoretical values) on the basis of the strength and elasticity modulus of the carbon fiber per se. Herein, the theoretical value is the value determined according to the equations (1) and (2).

EXAMPLE 4

A resin mixture (viscosity of 35 poises at 20° C.) prepared by homogeneously mixing and dissolving together 80 parts of resol type phenol resin "AH-343" (trade name of Lignyte, Co. Ltd.) and 20 parts of a component with curing function, "D5" (trade name of Lignyte, Co. Ltd.), containing a curing catalyst primarily comprising p-toluenesulfonic acid and a curing agent at ambient temperature, was coated on a cedar sheet of a thickness of 0.25 mm, by means of a coater to a final thickness of 150 g/mm$^2$. Continuous with the coating process, 75 strands of a carbon fiber "Besfite (registered trademark) HTA 6K" (Toho Rayon, Co. Ltd.) having a single fiber diameter of 7 microns, fiber number of 6,000, tensile strength of 3990 MPa and tensile elastic modulus of 238 GPa, were continuously arranged, with an equal spacing of 200 mm width, in the direction of the grain pattern of the cedar sheet, and continuously dried at 80° C. for 20 minutes. A cedar sheet of a thickness of 0.25 mm was placed on the resulting sheet and the entirety pressed by means of a roll, continuously, so that a wood based sheet was attached on both faces, at a rate of 3 m/min, to prepare a carbon fiber prepreg/wood based composite sheet of a width of 200 mm.

The resulting carbon fiber prepreg/wood based composite sheet was cut into a rectangular piece of a width of 200 mm and a length of 2,000 mm, which was then attached on both the surfaces of a glued laminated wood sheet composed of six cedar sheets each of a thickness of 25 mm, a width of 200 mm and a length of 200 mm while the fiber direction was kept in parallel, the surfaces having been coated with the same resin as described above in the amount of 150 g/m$^2$. Subsequently, the resulting material was heated and cured at a pressure of 10 kg/cm$^2$ and 60° C. for 2 hours, to prepare the carbon fiber reinforced glued laminate.

The resulting carbon fiber reinforced glued laminate had a bending strength of 68 MPa, which was an improvement of 17%, compared with the strength of the wood laminate prior to the reinforcement with the carbon fiber prepreg/wood based composite sheet of this Example, while the bending elastic modulus was additionally improved by 18%. Furthermore, the handleability was great, with no resulting waste such as release paper, so that the resulting lumber was excellent in terms of processability.

Furthermore, the block shear strength was measured as 10.3 MPa, and the adhesivity between the carbon fiber prepreg and the wood based sheet as well as the adhesivity between the wood based sheet and the glued laminated lumber was remarkable.

EXAMPLE 5

A strand of carbon fiber "Besfite (registered trademark) HTA 12K" (Toho Rayon, Co. Ltd.) having a single fiber diameter of 7 microns, fiber number of 12,000, tensile strength of 3890 MPa and tensile elastic modulus of 236 GPa, was continuously passed through a resin bath of a resin mixture (viscosity of 35 poises at 20° C.) produced by mixing and dissolving together 82 parts of a resol type phenol resin "AH-343" (trade name of Lignyte, Co. Ltd.) and 18 parts of a curing component, "D-5" (trade name of Lignyte, Co. Ltd.), containing a curing catalyst primarily comprising p-toluenesulfonic acid and a curing agent at ambient temperature, at 5 m/min for an impregnation time of 0.5 minute. Then, the amount of the resin contained therein was adjusted by means of a squeeze roll to 55% by weight. Continuously following the resin impregnation process, the strand impregnated with the resin was wound in parallel around a drum of a diameter of 90 cm carrying a preliminarily wound 0.25-mm thick spruce, to a final width of 100 cm, with the strand impregnated with the resin in parallel, followed by drying at 60° C. for one hour, to prepare the carbon fiber prepreg/wood composite sheet.

The resulting carbon fiber prepreg/wood composite sheet was cut off from the drum and was then cut into a rectangular shape of a width of 100 mm and a length of about 100 mm, and the sheet was laminated and placed in a mold of a depth of 3 mm, a width of 100 mm and a length of 100 mm while aligning the sides of the carbon fiber prepreg downward, followed by heating at a pressure of 10 kg/cm$^2$ and 60° C. for 2 hours, to prepare the carbon fiber, the resin and the wood based sheet.

The carbon fiber content in the cured laminate was 55 volume %. From this laminate was cut out a rectangular test piece of a width of 10 mm and a length of 100 mm, where the fiber direction was the lengthwise direction. The test piece was subjected to measurement of bending performance while holding the side attached with carbon fiber as the tensile side. The bending strength was 863 MPa; the bending elastic modulus was 73 GPa; and the block shear strength was 10.6 MPa. These values correspond to 94% and 95%, respectively, of the values proportionally calculated and determined (referred to as theoretical values) on the basis of the strength and elasticity modulus of the carbon fiber per se. Again, the theoretical values were values determined according to the equations (1) and (2).

COMPARATIVE EXAMPLE 4

In the same manner as in Example 5, except that the thickness of the spruce sheet was 2.3 mm, a carbon fiber prepreg/wood composite sheet was prepared. Because the resulting carbon fiber prepreg/wood composite sheet could not be rolled into a cylindrical shape, a longer size could not be made, so the resulting sheet could not be used for reinforcing glued laminated lumber of longer size.

EXAMPLE 6

In the same manner as in Example 4, except that a 0.25-mm thick spruce sheet was used in place of the 0.25-mm cedar sheet, a carbon fiber prepreg/wood composite sheet was prepared.

The resulting carbon fiber prepreg/wood composite sheet was cut into rectangular pieces of a thickness of 25 mm, a width of 200 mm and a length of 2,000 mm, which were then attached on both surfaces of a glued wood laminate composed of six cedar sheets each of a width of 200 mm and a length of 200 mm, with the fiber direction kept in parallel, the surfaces having been coated with the same resin as described above in an amount of 150 g/m$^2$. Subsequently, the resulting material was heated and cured at a pressure of 10 kg/cm2 and 60° C. for 2 hours, to prepare the carbon fiber reinforced glued laminate of this example.

The laminate showed improvement in the bending strength and the bending elastic modulus, of 24% and 18%, respectively, compared with the glued laminated lumber prior to the reinforcement with the carbon fiber prepreg/wood composite sheet of this example, while the bending elastic modulus was additionally improved by 18%. Furthermore, the handleability was great, without generation of waste such as release paper.

Furthermore, the block shear strength was measured as 10.5 MPa, and the adhesivity between the carbon fiber prepreg and the wood based sheet as well as the adhesivity between the wood based sheet and the glued laminated lumber was also remarkable.

EXAMPLE 7

In the same manner as in Example 3, except that a 0.03-mm thick paper made of natural cellulose was used instead of the cedar sheet used in Example 3, a carbon fiber/wood composite sheet was prepared.

The carbon fiber content in the cured product of the carbon fiber prepreg of the composite sheet was 50 volume %. From the composite sheet was cut out a rectangular shape of a width of 10 mm and a length of 100 mm, which was used as a test piece. The test piece was subjected to measurement of bending performance while holding the side attached with the carbon fiber as the tensile side. The bending strength was 1410 MPa; the bending elastic modulus was 120 GPa; and the block shear strength was 9.5 MPa. The values of the block shear strength and the bending elastic modulus correspond to 95% and 97%, respectively, of the values calculated (theoretical values) on the basis of the strength and elasticity modulus of the carbon fiber per se. Again, the theoretical values were determined according to the equations (1) and (2).

COMPARATIVE EXAMPLE 5

In the same manner as in Example 7, except that the thickness of the natural cellulose paper was 0.005 mm, a carbon fiber prepreg/wood composite sheet was prepared. This comparative composite showed paper breakage in handling.

EXAMPLE 8

In the same manner as in Example 3, except for the use of a resorcinol type resin "PR-1" (registrated trade name; Aika kogyo Co. Ltd.) instead of the resol type phenol resin used in Example 3, a resin mixture was prepared. The viscosity of the resin mixture at 20° C. was 15 poises. In the same manner as in Example 3, a carbon fiber prepreg/wood composite sheet was prepared by using the resin mixture.

The resulting wood reinforcing carbon fiber prepreg/wood composite sheet had a gel time of 73 minutes at 30° C.

In the same manner as in Example 3, a laminate was prepared using the carbon fiber prepreg/wood composite sheet. The measured bending strength was 1103 MPa; the bending elastic modulus was 103 GPa; and the block shear strength was 9.5 MPa.

EXAMPLE 9

In the same manner as in Example 5, except that the thickness of the spruce sheet was 1.7 mm, a rectangular test piece laminated with the carbon fiber/wood composite was prepared. The bending strength was 281 MPa; the bending elastic modulus was 24 GPa; and the block shear strength was 10.5 MPa. These values for the block shear strength and the bending elastic modulus corresponded to 95% and 95%, respectively, of the values calculated (theoretical values) on the basis of the strength and elasticity modulus of the carbon fiber per se. Again, the theoretical values were the values determined according to the equations (1) and (2).

EXAMPLE 10

In the same manner as in Example 5, except that Pork Orford cedar was used in place of the spruce used in Example 5, a rectangle test piece laminate with the carbon fiber/wood composite sheet was prepared. The bending strength was 862 MPa; the bending elastic modulus was 74 GPa; and the block shear strength was 10.5 MPa. These values for bending strength and bending elastic modulus correspond to 95% and 95%, respectively, of the values calculated (theoretical values) on the basis of the strength and elasticity modulus of the carbon fiber per se. Again, the theoretical values were determined according to the equations (1) and (2).

For Examples 1 to 10 and the Comparative Examples 1 to 5, physico-chemical properties of the resin mixtures, prepreg sheets, carbon fiber composite materials, carbon fiber/wood composite sheets, and carbon fiber reinforced woods are comparatively shown in the following Table 1.

TABLE 1-1

| | | Example 1 | Comparative Example 1 | Comparative Example 2 | Comparative Example 3 |
|---|---|---|---|---|---|
| Viscosity (P) of mixture resin at 20° C. | | 35 | 160 | 2 | 33 |
| Gel time (min) of prepreg sheet at 30° C. | | 150 | | | 30 |
| Carbon fiber composite material | Carbon fiber content (%) | 60 | | | |
| | Bending strength (MPa) | 1634 | 830 | | 1205 |
| | Bending elastic modulus (GPa) | 135 | 118 | | 113 |
| | Interlaminar shear strength (MPa) | 74 | 31 | | 32 |
| | Bending strength in % to theoretical value | 70 | | | |
| | Bending elastic modulus in % to theoretical value | 95 | | | |
| Carbon fiber composite wood based sheet | Thickness (Mm) of material of wood based sheet to be attached | | | | |
| | Carbon fiber content (%) | | | | |
| | Bending strength (MPa) | | | | |
| | Bending elastic modulus (GPa) | | | | |
| | Block shear strength (MPa) | | | | |
| | Bending strength in % to theoretical value | | | | |
| | Bending elastic modulus in % to theoretical value | | | | |

TABLE 1-1-continued

|  |  | Example 1 | Comparative Example 1 | Comparative Example 2 | Comparative Example 3 |
|---|---|---|---|---|---|
| Carbon fiber reinforced wood | Thickness (mm) of wood to be reinforced |  |  |  |  |
|  | Bending strength (MPa) or increment in % |  |  |  |  |
|  | Bending elastic modulus (GPa) or increment in % |  |  |  |  |
|  | Block shear strength (MPa) |  |  |  |  |

TABLE 1-2

|  |  | Example 2 | Example 3 | Example 4 | Example 5 | Comp Ex 4 | Example 6 |
|---|---|---|---|---|---|---|---|
| Viscosity (P) of mixture resin at 20° C. | | 35 | 35 | 35 | 35 | 35 | 35 |
| Gel time (min) of prepreg sheet at 30° C. | | 150 | 150 |  |  |  |  |
| Carbon fiber composite material | Carbon fiber content (%) |  |  |  |  |  |  |
|  | Bending strength (MPa) |  |  |  |  |  |  |
|  | Bending elastic modulus (GPa) |  |  |  |  |  |  |
|  | Interlaminar shear strength (MPa) |  |  |  |  |  |  |
|  | Bending strength in & to theoretical value |  |  |  |  |  |  |
|  | Bending elastic modulus in % to theoretical value |  |  |  |  |  |  |
| Carbon fiber composite wood based sheet | Thickness (mm) of material of wood based sheet to be attached |  | Cedar 0.1 | Cedar 0.25*2 | Spruce 0.25 | Spruce 2.3 | Spruce 0.25 |
|  | Carbon fiber content (%) |  | 55 |  | 55 |  |  |
|  | Bending strength (MPa) |  | 1163 |  | 863 |  |  |
|  | Bending elastic modulus (GPa) |  | 102 |  | 73 |  |  |
|  | Block shear strength (MPa) |  | 9.6 |  | 10.6 |  |  |
|  | Bending strength in % to theoretical value |  | 93 |  | 94 |  |  |
|  | Bending elastic modulus in % to theoretical value |  | 98 |  | 95 |  |  |
| Carbon fiber reinforced wood | Thickness (mm) of wood to be reinforced | Cedar 24 |  | Cedar 25*6 |  |  | Spruce 25*6 |
|  | Bending strength (MPa) or increment in % | 73 MPa |  | 17% |  |  | 24% |
|  | Bending elastic modulus (GPa) or increment in % | 7.3 GPa |  | 18% |  |  | 18% |
|  | Block shear strength (MPa) |  |  |  |  |  | 10.5 |

TABLE 1-3

|  |  | Example 7 | Comparative Example 5 | Example 8 | Example 9 | Example 10 |
|---|---|---|---|---|---|---|
| Viscosity (P) of mixture resin at 20° C. | | 35 | 35 | 15 | 35 | 35 |
| Gel time (min) of prepreg sheet at 30° C. | |  |  | 73 |  |  |
| Carbon fiber composite material | Carbon fiber content (%) |  |  |  |  |  |
|  | Bending strength (MPa) |  |  |  |  |  |
|  | Bending elastic modulus (GPa) |  |  |  |  |  |
|  | Interlaminar shear strength (MPa) |  |  |  |  |  |
|  | Bending strength in & to theoretical value |  |  |  |  |  |
|  | Bending elastic modulus in % to theoretical value |  |  |  |  |  |

TABLE 1-3-continued

|  |  | Example 7 | Comparative Example 5 | Example 8 | Example 9 | Example 10 |
|---|---|---|---|---|---|---|
| Carbon fiber composite wood based sheet | Thickness (mm) of material of wood based sheet to be attached | Paper 0.03 | Paper 0.005 | Cedar 0.1 | Spruce 1.7 | Pork Orford cedar 0.25 |
|  | Carbon fiber content (%) | 50 |  |  |  |  |
|  | Bending strength (MPa) | 1410 |  | 1103 | 281 | 862 |
|  | Bending elastic modulus (GPa) | 120 |  | 103 | 24 | 74 |
|  | Block shear strength (MPa) | 9.5 |  | 9.5 | 10.5 | 10.5 |
|  | Bending strength in % to theoretical value | 95 |  |  | 95 | 95 |
|  | Bending elastic modulus in % to theoretical value | 97 |  |  | 95 | 95 |
| Carbon fiber reinforced wood | Thickness (mm) of wood to be reinforced |  |  |  |  |  |
|  | Bending strength (MPa) or increment in % |  |  |  |  |  |
|  | Bending elastic modulus (GPa) or increment in % |  |  |  |  |  |
|  | Block shear strength (MPa) |  |  |  |  |  |

The wood reinforcing carbon fiber prepreg of the present invention increases the strength and rigidity of wood, and has good adhesivity, water resistance, corrosion resistance, fire resistance, thermal resistance and long shelf life.

The carbon fiber prepreg/wood composite sheet of the present invention never requires any release paper for production and storage, and therefore, no release paper is generated as waste.

Additionally, wood laminates produced by laminating to solid woods or laminates with the carbon fiber prepreg per se, or the carbon fiber prepreg/wood composite sheet have high rigidity and strength, and therefore, various large buildings, wood bridges and domes can be produced therefrom.

Even wood conventionally never used due to its low strength and low rigidity can be imparted with high strength and rigidity, so that a valuable natural resource can be effectively utilized. Thus, the present invention is also advantageous for environmental preservation.

What is claimed is:

1. A wood reinforcing carbon fiber prepreg produced by impregnating carbon fiber sheet or strands with a resin mixture having a viscosity of 3 to 150 poises at 20° C. and a gel time of at least 50 minutes, wherein said resin mixture comprises one or more resins selected from the group consisting of resorcinol based resins and resol type phenol based resins, a curing component comprising formaldehyde and an organic or inorganic acid curing catalyst.

2. A wood reinforcing carbon fiber prepreg according to claim 1 wherein the mixture resin is in a liquid form.

3. A carbon fiber reinforced wood produced by bonding the wood reinforcing carbon fiber prepreg according to claim 1 to the wood to be reinforced.

4. A carbon fiber reinforced wood according to claim 3, wherein the wood reinforcing carbon fiber prepreg is bonded to the wood to be reinforced by heating and pressing.

5. A composite comprising a wood reinforcing carbon fiber prepreg according to claim 1 bonded on at least one face to a wood-based sheet of a thickness of 0.01 mm to 2.0 mm.

6. A composite according to claim 5, wherein the wood-based sheet is prepared from spruce or Pork Orford cedar.

7. A composite comprising a wood reinforcing carbon fiber prepreg according to claim 1 bonded on at least one surface to a wood-based sheet, wherein the wood reinforcing carbon fiber prepreg according to claim 1 is in the form of strands arranged in parallel on a surface of the wood-based sheet, said wood-based sheet having a thickness of 0.01 mm to 2.0 mm.

8. A composite according to claim 7 further comprising a second wood-based sheet attached to the other surface of the wood reinforcing carbon fiber prepreg.

9. A composite according to claim 5 wherein the resin mixture contains one or more resins selected from resorcinol based resins and resol type phenol based resins, a curing component selected from the group consisting of curing agents comprising formaldehyde and an organic or inorganic acid curing catalyst.

10. A composite according to claim 5 wherein the wood reinforcing carbon fiber prepreg is bonded to the wood-based sheet by heating and pressing.

11. A laminate comprising a wood reinforcing carbon fiber prepreg according to claim 5 wood to be reinforced, said composite being laminated to the wood to be reinforced by heating and pressing against a surface of solid wood or surface of a glued laminated lumber or by insertion between plural wood laminae to form an assembly, and heating and pressing the assembly.

12. A laminate of the composite according to claim 10 and wood to be reinforced, said composite being laminated to the wood to be reinforced by heating and pressing against a surface of solid wood or of a glued laminated lumber or by insertion between plural wood laminae to form an assembly, and heating and pressing the assembly.

* * * * *